United States Patent
Holung et al.

(10) Patent No.: US 9,625,952 B2
(45) Date of Patent: Apr. 18, 2017

(54) HINGE ASSEMBLIES

(71) Applicant: Lenovo (Singapore) Pte. Ltd., Singapore (SG)

(72) Inventors: Joseph Anthony Holung, Wake Forest, NC (US); Bouziane Yebka, Apex, NC (US); Tin-Lup Wong, Chapel Hill, NC (US); Seita Horikoshi, Zama (JP); Yoshiharu Uchiyama, Isehara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 205 days.

(21) Appl. No.: 14/482,670

(22) Filed: Sep. 10, 2014

(65) Prior Publication Data
US 2016/0070310 A1    Mar. 10, 2016

(51) Int. Cl.
*G06F 1/16* (2006.01)
*E05D 3/12* (2006.01)

(52) U.S. Cl.
CPC ........... *G06F 1/1681* (2013.01); *E05D 3/122* (2013.01); *G06F 1/1618* (2013.01); *E05Y 2900/606* (2013.01)

(58) Field of Classification Search
CPC ...................................................... G06F 1/162
See application file for complete search history.

(56) References Cited

U.S. PATENT DOCUMENTS

| | | | | |
|---|---|---|---|---|
| 5,987,704 A * | 11/1999 | Tang | ...................... | G06F 1/1681 16/342 |
| 6,519,812 B2 * | 2/2003 | Ko | ...................... | H04N 5/2251 16/248 |
| 7,345,872 B2 * | 3/2008 | Wang | ...................... | G06F 1/1618 16/354 |
| 8,782,853 B2 * | 7/2014 | Ge | ...................... | G06F 1/1681 16/354 |
| 8,938,855 B2 * | 1/2015 | Ahn | ...................... | F16C 11/04 16/354 |
| 9,274,552 B2 * | 3/2016 | Ahn | ...................... | G06F 1/1641 |
| 2005/0122671 A1 * | 6/2005 | Homer | ...................... | G06F 1/1618 361/679.27 |
| 2008/0242359 A1 * | 10/2008 | Seol | ...................... | G06F 1/1616 455/566 |
| 2009/0070961 A1 * | 3/2009 | Chung | ...................... | E05D 3/122 16/354 |
| 2010/0277860 A1 * | 11/2010 | Jeong | ...................... | H04M 1/0216 361/679.27 |
| 2012/0147535 A1 * | 6/2012 | Ahn | ...................... | G06F 1/1641 361/679.01 |
| 2013/0322004 A1 * | 12/2013 | Park | ...................... | F16C 11/10 361/679.27 |
| 2015/0023030 A1 * | 1/2015 | Tsukamoto | ...................... | G06F 1/1652 362/419 |
| 2015/0146362 A1 * | 5/2015 | Meyers | ...................... | E05D 3/122 361/679.27 |

* cited by examiner

*Primary Examiner* — Anthony Q Edwards
(74) *Attorney, Agent, or Firm* — Brian J. Pangrle

(57) ABSTRACT

An apparatus can include a processor; memory accessible by the processor; a first housing that includes a front side and a back side and a thickness therebetween; a second housing that includes a front side and a back side and a thickness therebetween; a first gear operatively coupled to the first housing; and a second gear operatively coupled to the second housing where the first and second gears mesh to orient the first and second housings in a front side to front side orientation and in a back side to back side orientation.

20 Claims, 19 Drawing Sheets

HINGE ASSEMBLIES

TECHNICAL FIELD

Subject matter disclosed herein generally relates to technology for hinges.

BACKGROUND

Various types of computing devices, display devices, computing and display devices, etc. exist where, for example, one device may cooperate with another device or component of an assembly or system. As an example, consider a display in a display housing that cooperates with a keyboard in a keyboard housing, which may, for example, allow for input of information via the display in addition to, or as an alternative to, input of information via the keyboard. In such an example, the keyboard housing and the display housing may connect via a hinge, for example, that allows for pivoting of the housings to achieve a back-to-back orientation of the keyboard housing and the display housing. In such an orientation, the display may be used on one side as a tablet (e.g., consider a scenario where the display is a touchscreen display) while the keyboard faces outwardly from the opposing side. Various technologies and techniques described herein pertain to devices, components, assemblies, etc. that include a keyboard in a keyboard housing.

SUMMARY

An apparatus can include a processor; memory accessible by the processor; a first housing that includes a front side and a back side and a thickness therebetween; a second housing that includes a front side and a back side and a thickness therebetween; a first gear operatively coupled to the first housing; and a second gear operatively coupled to the second housing where the first and second gears mesh to orient the first and second housings in a front side to front side orientation and in a back side to back side orientation. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, a system may include a display in a display housing that cooperates with a keyboard in a keyboard housing, which may, for example, allow for input of information via the display in addition to, or as an alternative to, input of information via the keyboard. In such an example, the keyboard housing and the display housing may connect via a hinge (e.g., or hinges), for example, that allows for pivoting of the housings to achieve a folded orientation of the keyboard housing and the display housing. As an example, where a display faces outwardly in a folded orientation, the display of the system may be used as a tablet (e.g., consider a scenario where the display is a touchscreen display).

As another example, a system can include multiple housings where at least one of the housings is a display housing. As an example, a system can include two display housings coupled via one or more hinges where the display housings may be pivotable to a planar orientation and pivotable to a folded orientation, which may be one of a back-to-back, a front-to-back or a front-to-front orientation.

Figure 1:
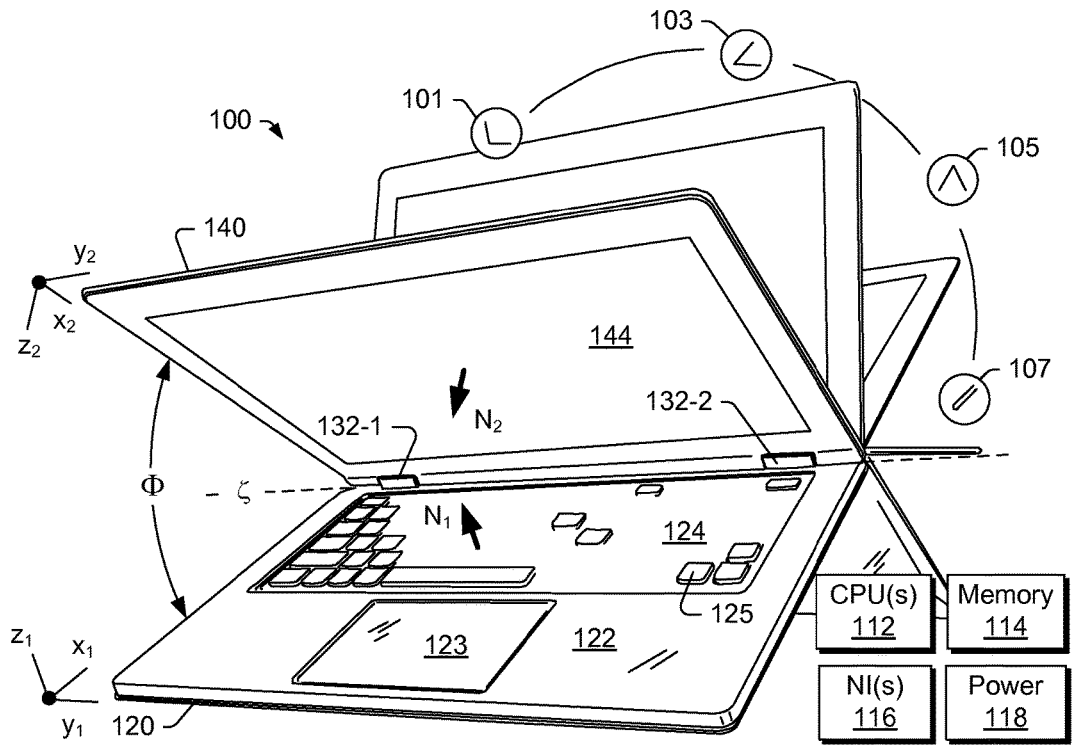
FIG. 1 is a diagram of examples of systems.
Figure 1:
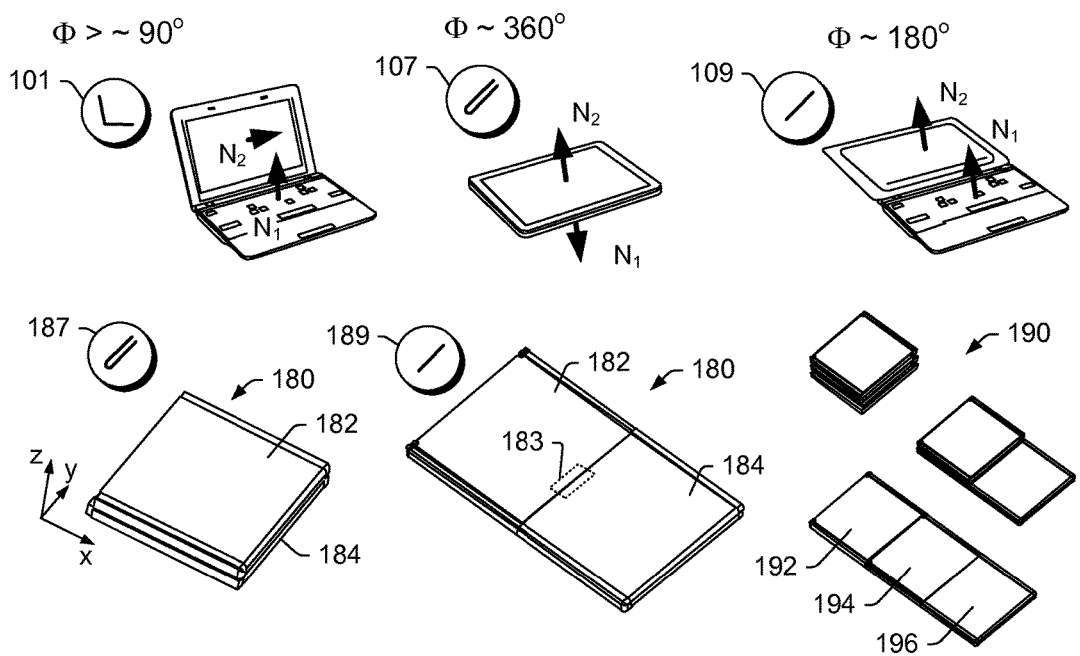

FIG. 1 shows an example of a system 100 that includes a keyboard housing 120 and a display housing 140 that are pivotable with respect to each other via movement about one or more hinges 132-1 and 132-2. FIG. 1 also shows an example of a system 180 that includes a first housing 182 and a second housing 184 that are pivotable with respect to each other via movement about one or more hinges 183 and an example of a system 190 that includes a first housing 192, a second housing 194 and a third housing 196 that may be pivotable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

Figure 2:
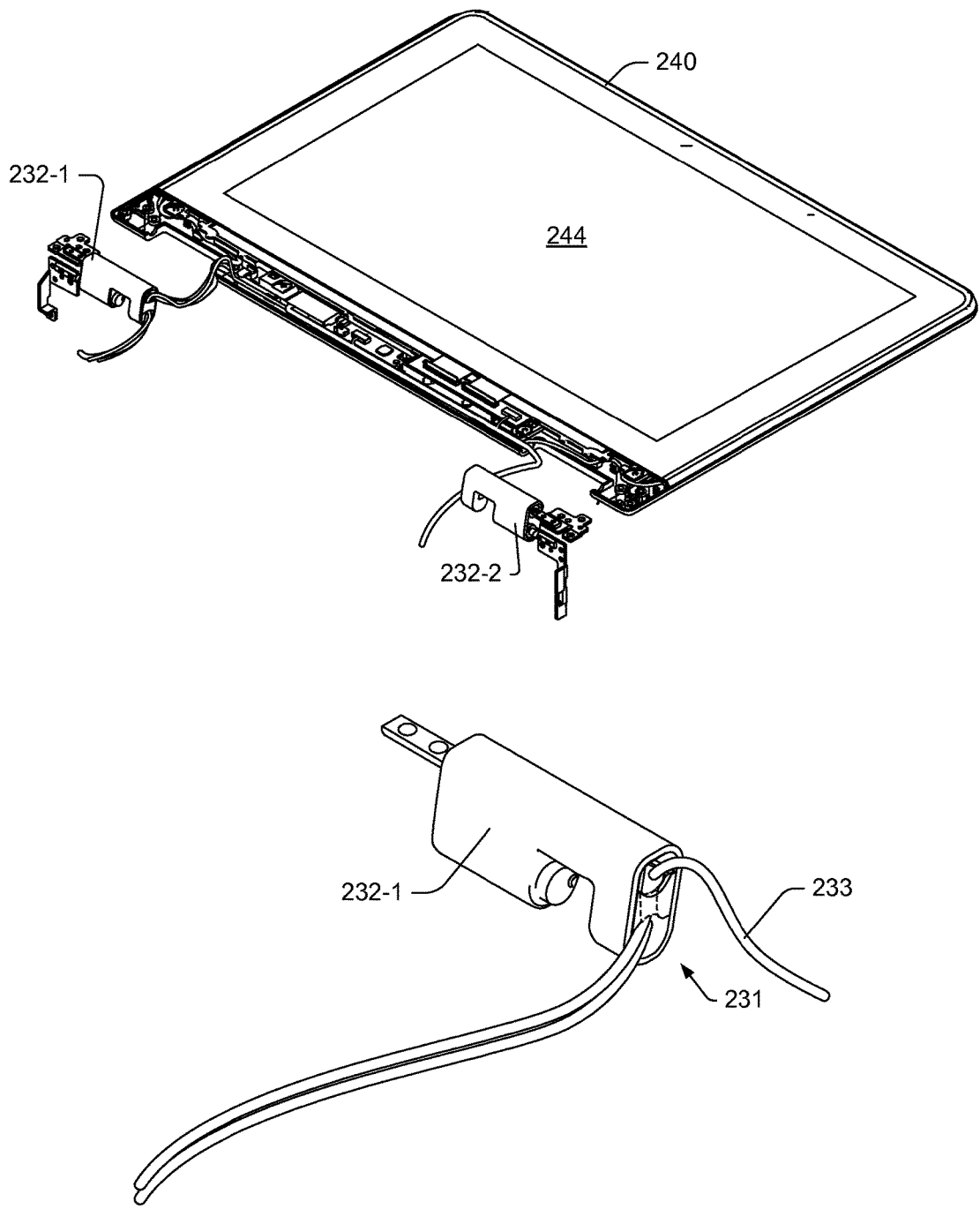
FIG. 2 is a diagram of an example of a housing and hinges.

FIG. 2 shows an example of a display housing 240 that includes a display 244 and hinges 232-1 and 232-2 that may be operatively coupled to the display housing 240. As an example, a hinge can include one or more features for cable routing. For example, the hinge 232-1 includes a mechanism 231 that can route one or more cables 233, for example, in a manner that may help protect the one or more cables 233 from damage responsive to pivoting of a housing or housings about the hinge 232-1.

Figure 3:
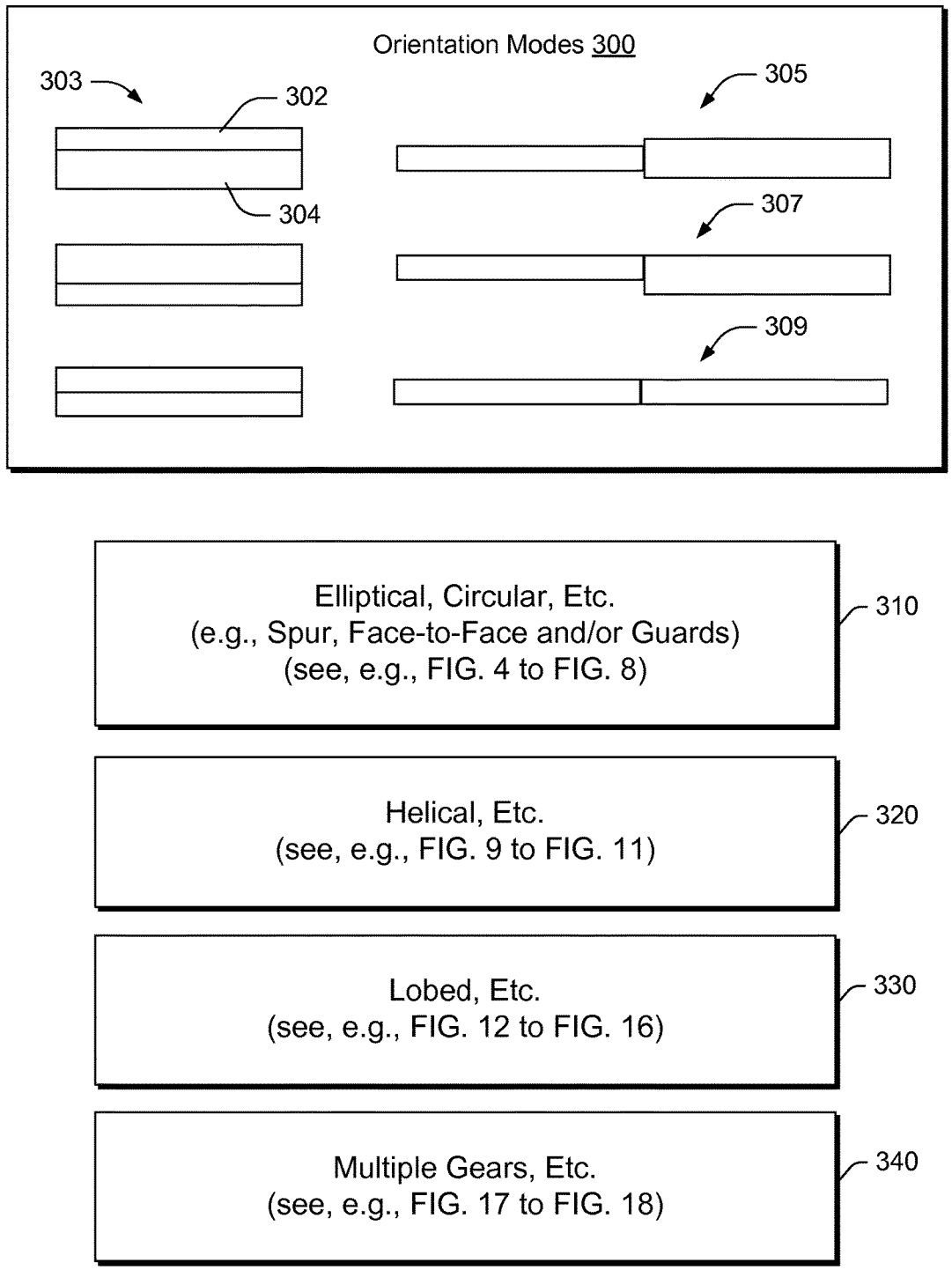
FIG. 3 is a diagram of example of systems.

FIG. 3 shows various examples of orientation modes 300, including individual orientation modes 303, 305, 307 and 309 of two housings 302 and 304, which may differ as to one or more of their dimensions. The mode 303 may be referred to as a folded mode, the mode 305 may be referred to as a lay centered mode, the mode 307 may be referred to as a lay elevated mode and the mode 309 may be referred to as a lay flat mode; noting that an inverted version of the lay elevated mode 307 may be a type of lay flat mode (e.g., with a step between housings 302 and 304).

As an example, the lay centered mode 305 can include a thinner housing that is positionable approximately midposition in an opened configuration. As shown, the lay flat mode 309 may be a type of centered mode where the two housings 302 and 304 have about the same thickness.

FIG. 3 also shows blocks 310, 320, 330 and 340 that correspond to various examples of hinges. As an example, such hinges may be used to operatively couple two or more housings. As an example, such housings may include thicknesses that are approximately the same or may include one or more thicknesses that differ from another thickness. As an example, an approximately circular hinge may be suitable to operatively couple two housings that have thickness that are approximately the same while an approximately elliptical hinge may be suitable to operatively coupled two housings that have thicknesses that differ.

Figure 4:
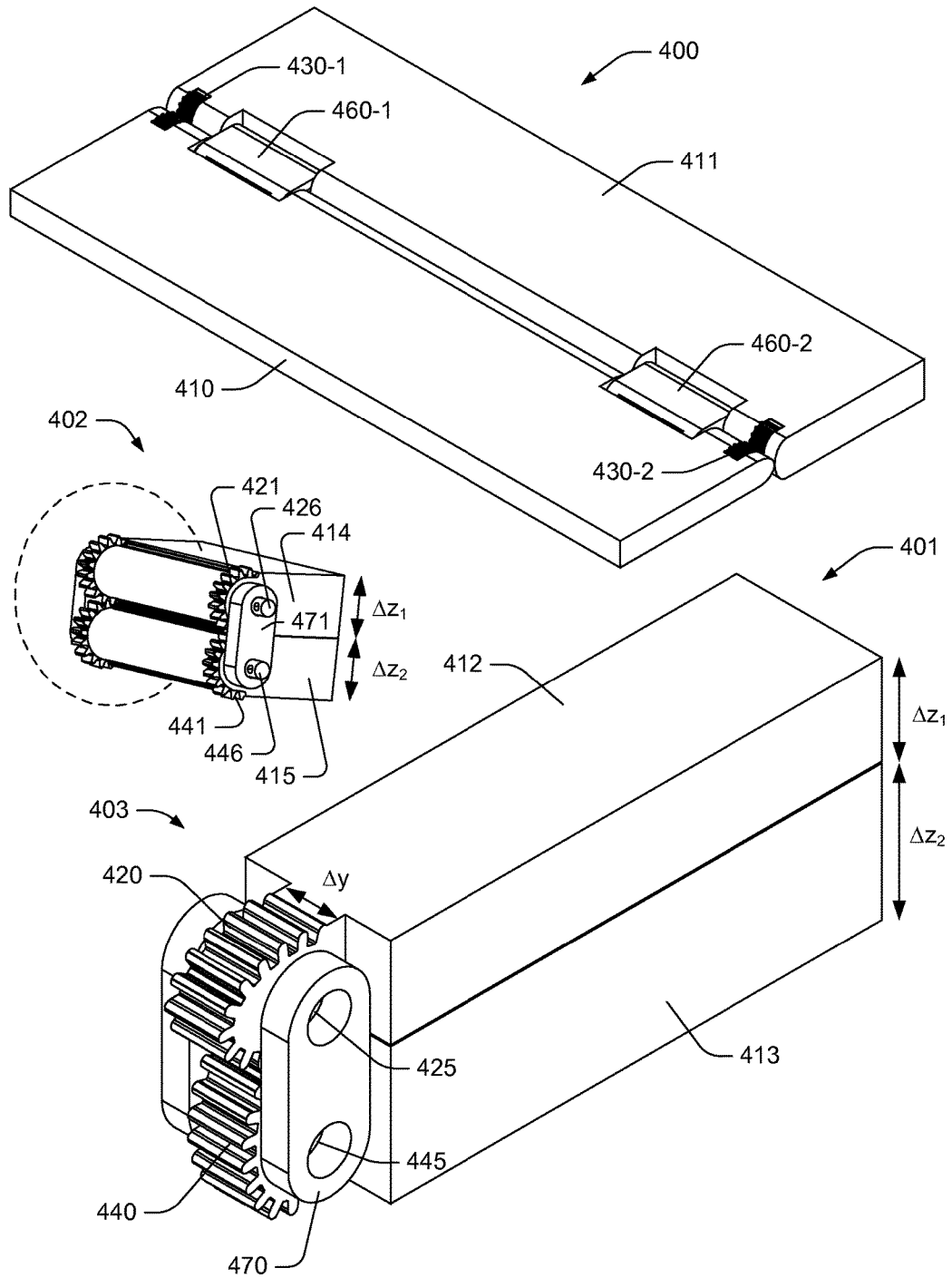
FIG. 4 is a diagram of examples of assemblies.

FIG. 4 shows an example of an assembly 400, an example of an assembly 401 and an example of an assembly 402. The assembly 400 includes a first housing 410 that includes a front side and a back side and a thickness therebetween, a second housing 411 that includes a front side and a back side and a thickness therebetween; a set of gears 430-1 and a set of gears 430-2, a first coupler 460-1 and a second coupler 460-2. As shown in FIG. 4, the respective thicknesses of the housings 410 and 411 differ.

The assembly 401 includes a first housing 412 that includes a front side and a back side and a thickness therebetween and a second housing 413 that includes a front side and a back side and a thickness therebetween where the respective thicknesses of the housings 412 and 413 differ (see, e.g., $\Delta z_1$ and $\Delta z_2$). Also shown in FIG. 4, the assembly 401 includes a first gear 420 operatively coupled to the first housing 412 and a second gear 440 operatively coupled to the second housing where the first and second gears 420 and 440 mesh to orient the first and second housings 412 and 413 in a front side to front side orientation and in a back side to back side orientation. As shown in FIG. 4, a gear may be defined with respect to a dimension such as the dimension Δy (e.g., a length along an axis of rotation of a gear). As an example, the gears 420 and 440 may be of approximately the same length (e.g., as measured along their respective axes).

As shown in FIG. 4, the gears 420 and 440 are elliptical in shape and rotate about respective central axles 425 and 445. The axels 425 and 445 may be operatively coupled by a coupler 470 that may include a first piece and a second piece, for example, to receive ends of the axles 425 and 445.

The assembly 402 includes a first housing 414 that includes a front side and a back side and a thickness therebetween and a second housing 415 that includes a front side and a back side and a thickness therebetween where the respective thicknesses of the housing 414 and 415 are substantially equal (see, e.g., $\Delta z_1$ and $\Delta z_2$). Also shown in FIG. 4, the assembly 402 includes a first gear 421 operatively coupled to the first housing 414 and a second gear 441 operatively coupled to the second housing 415 where the first and second gears 421 and 441 mesh to orient the first and second housings 414 and 415 in a front side to front side orientation and in a back side to back side orientation.

In the assembly 402, the gears 421 and 441 are substantially circular and rotate about respective central axles 426 and 446. The axels 426 and 446 may be operatively coupled by a coupler 471. In the assembly 402, another set of gears may be included, for example, spaced a distance from the gears 421 and 441.

As an example, a hinge assembly can include two elliptical gears, one attached to a base and one attached to a top cover. In such an example, the major axis of the ellipse can be equal in length to the thickness of the base while the minor axis of the ellipse can be equal to the top cover thickness, for example, where the base is assumed to be thicker than the top cover. In such an assembly, a link can connect the gears (e.g., via axles, etc.) where the gears maintain a constant distance (e.g., equal to the sum of the lengths of the major semi-axis and minor semi-axis). In such an example, the hinge assembly can help to ensure smooth rolling and engagement without separation. As an example, gears may be of an elliptical or other shape (e.g., with two dimensions that correspond to two housing thicknesses) and assembled orthogonal to each other (e.g., as defined by the two dimensions). In such an example, coordinated motion may be achieved as one housing is rotated relative to another housing. Such motion may be synchronous motion. As an example, motion may be about 360 degrees, for example, for a back side to back side orientation and a front side to front side orientation of two housings.

Figure 5:
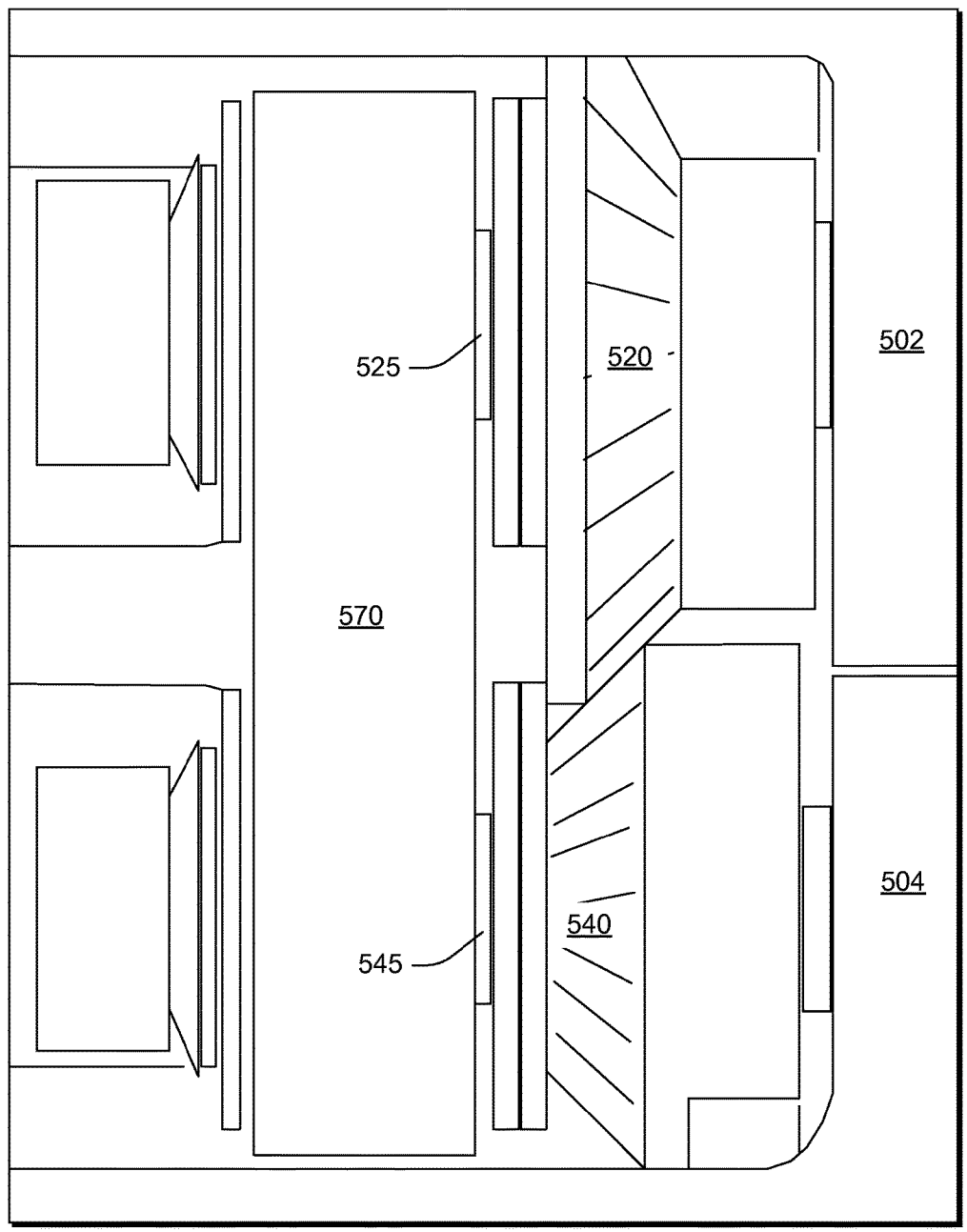
FIG. 5 is a diagram of an example of an assembly.

FIG. 5 shows an example of an assembly 500 that includes a first housing 502 that includes a front side and a back side and a thickness therebetween, a second housing 504 that includes a front side and a back side and a thickness, a first gear 520 operatively coupled to the first housing 502 and a second gear 540 operatively coupled to the second housing 504. In such an example, the first and second gears 520 and 540 mesh to orient the first and second housings 502 and 504, for example, in a front side to front side orientation and in a back side to back side orientation.

In the assembly 500, the gears 520 and 540 rotate about respective axles 525 and 545 that are coupled via a coupler 570. The gears 520 and 540 may be elliptical or circular and include teeth along axial faces. For example, the gears 520 and 540 may include annular faces that may be disposed at an angle such as an angle that may be defined at least in part via a cone (e.g., a cone with a circular cross-section orthogonal to an axis, a cone with a circular cross-section orthogonal to an axis, etc.). As an example, the gears 520 and 540 may be defined in part by respective bevel angles.

Figure 6:
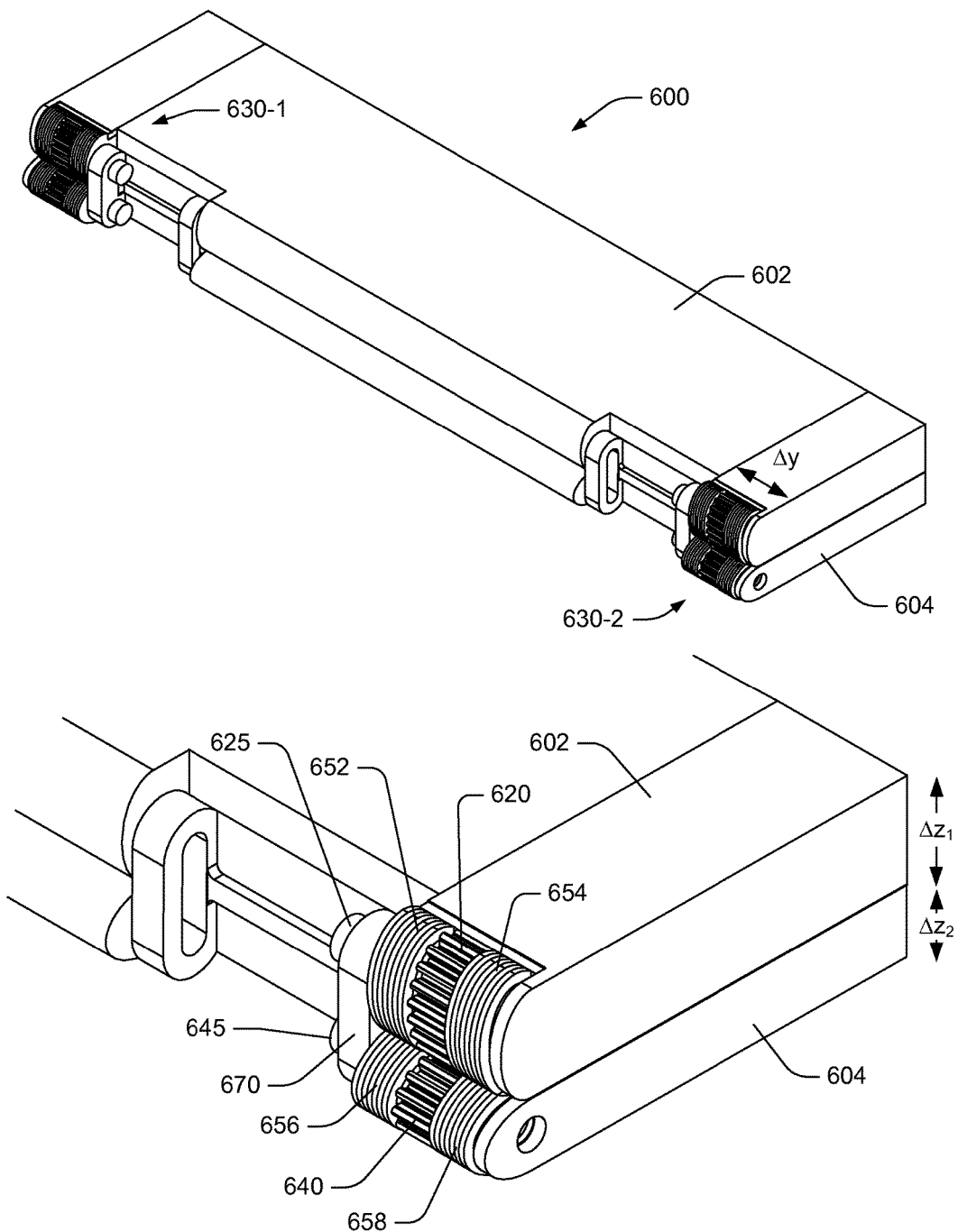
FIG. 6 is a diagram of an example of an assembly.

FIG. 6 shows an example of an assembly 600 that includes a first housing 602 that includes a front side and a back side and a thickness therebetween, a second housing 604 that includes a front side and a back side and a thickness, a first set of gears 630-1 and a second set of gears 630-2. FIG. 6 shows thicknesses $\Delta z_1$ and $\Delta z_2$ as well as a dimension $\Delta y$, which may be a gear region dimension.

As shown in FIG. 6, a first gear 620 is operatively coupled to the first housing 602 and a second gear 640 is operatively coupled to the second housing 604. In such an example, the first and second gears 620 and 640 mesh to orient the first and second housings 602 and 604, for example, in a front side to front side orientation and in a back side to back side orientation.

In the assembly 600, the gears 620 and 640 rotate about respective axles 625 and 645 that are coupled via a coupler 670. The gears 620 and 640 may be elliptical or circular and include teeth. In the example of FIG. 6, sets of plates 652 and 654 are disposed adjacent to the gear 620 and sets of plates 656 and 658 are disposed adjacent to the gear 640. Such plates may mesh, for example, with interference fits therebetween to add friction or with clearances therebetween. Such plates may act as guards that hinder objects from getting caught in the gears 620 and 640 as they mesh (e.g., during rotation of at least one of the gears).

As an example, an assembly can include spur gears with spacer and/or side plates. Such an approach may act to reduce risk of finger pinch as the plates, which may be on either side of a spur gear can help prevent a finger from entering a gear contact region. In such an example, an outer perimeter of a plate may match that of a gear teeth outer perimeter, for example, so sliding an assembly, on a delicate desk surface, may be smooth rather than risking a spur gear gouging/marring the surface (e.g., in absence of the plates).

Figure 7:
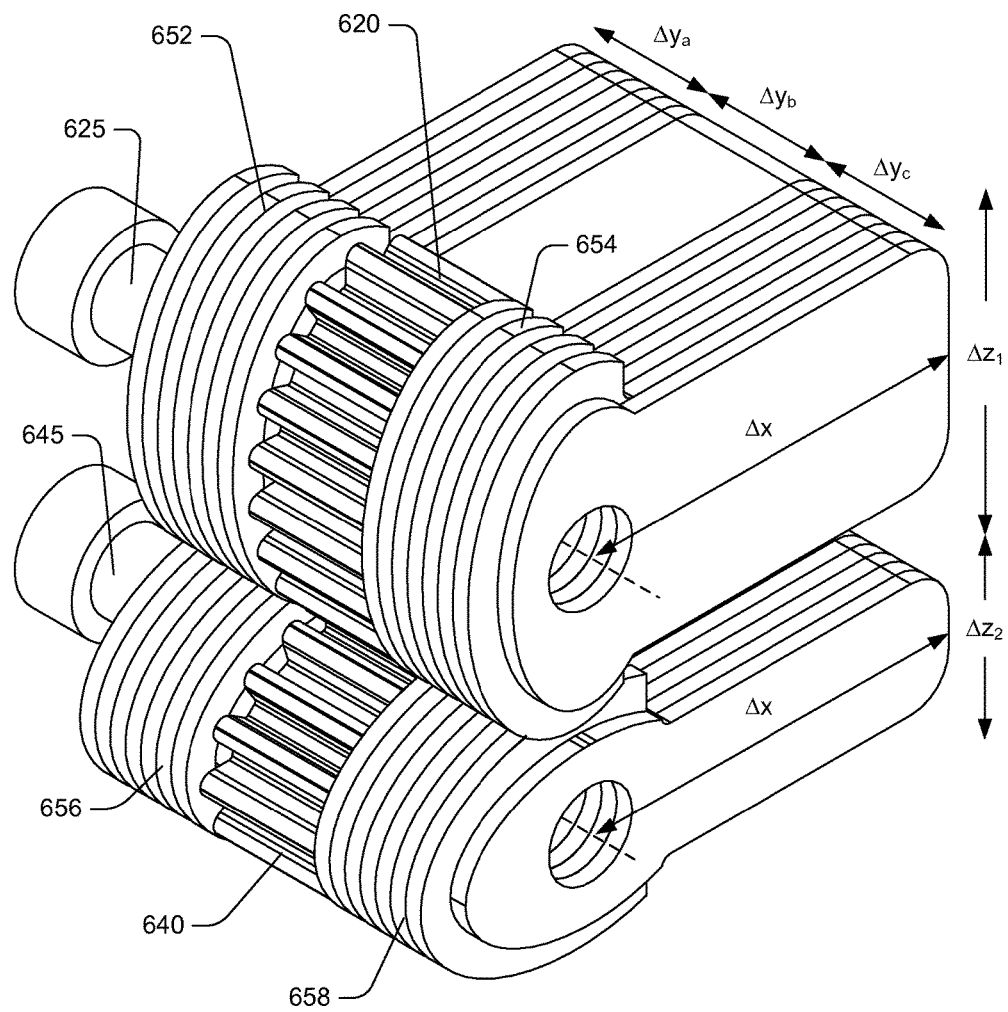
FIG. 7 is a diagram of a portion of the assembly of FIG. 6.

FIG. 7 shows a view of the gears 620 and 640, the axles 625 and 645 and the sets of plates 652, 654, 656 and 658. As shown, the sets of plates 652, 654, 656 and 658 may include extensions or tongue portions and head portions. For example, an extension may be received by a housing to support the head portion of a set of plates. As an example, each of the gears 620 and 640 can include a gear head portion and an extension or a tongue where such an extension may be received by a housing to support the gear head portion. Various examples of dimensions are shown in FIG. 7, including an axis to tongue end dimension $\Delta x$, thickness dimensions $\Delta z_1$ and $\Delta z_2$ and dimensions $\Delta y_a$, $\Delta y_b$ and $\Delta y_c$, which correspond to dimensions of the set of plates 652, the gear 620 and the set of plates 654; noting that dimensions may be specified that correspond to the set of plates 656, the gear 640 and the set of plates 658.

Figure 8:
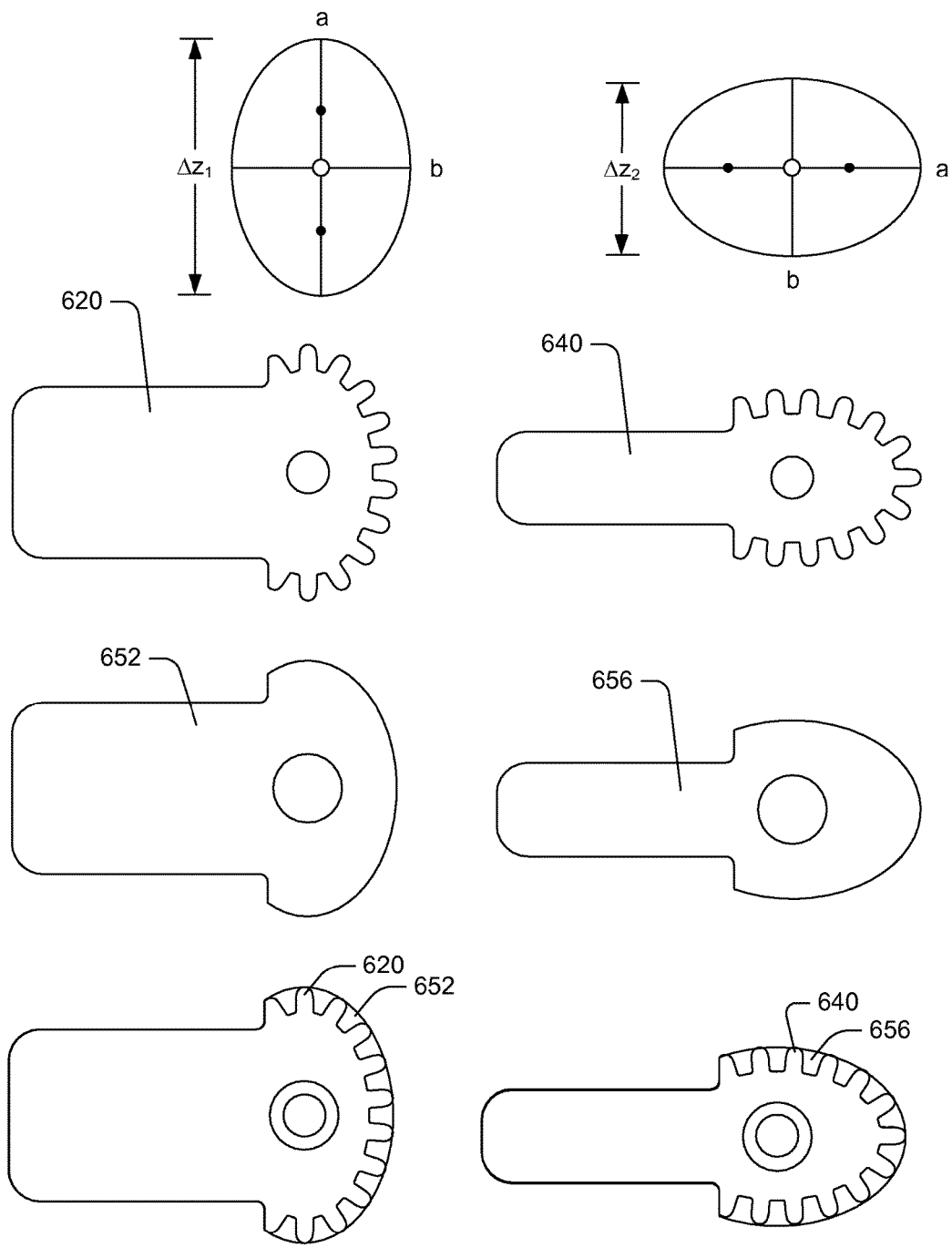
FIG. 8 is a diagram of a portion of the assembly of FIG. 6.

FIG. 8 shows side views of the gear 620, the gear 640, one of the plates of the set of plates 652 and one of the plates of the set of plates 656. As shown, shapes may be elliptical and defined by a major axis (a) and a minor axis (b), which intersect at a center. As mentioned, a gear may rotate about an axle where the axle may be at the center of the gear. As an example, one gear may rotate with respect to another gear or gears may rotate in unison (e.g., synchronously).

As illustrated in FIG. 8, the gear 620 may be aligned along a major axis (a) and the gear 640 may be aligned along a minor axis (b). For example, the major axis (a) of the gear 620 may be co-axial with the minor axis (b) of the gear 640 or, for example, where housings are back-to-back or front-to-front, the minor axis (b) of the gear 620 may be substantially parallel to the major axis (a) of the gear 640.

Figure 9:
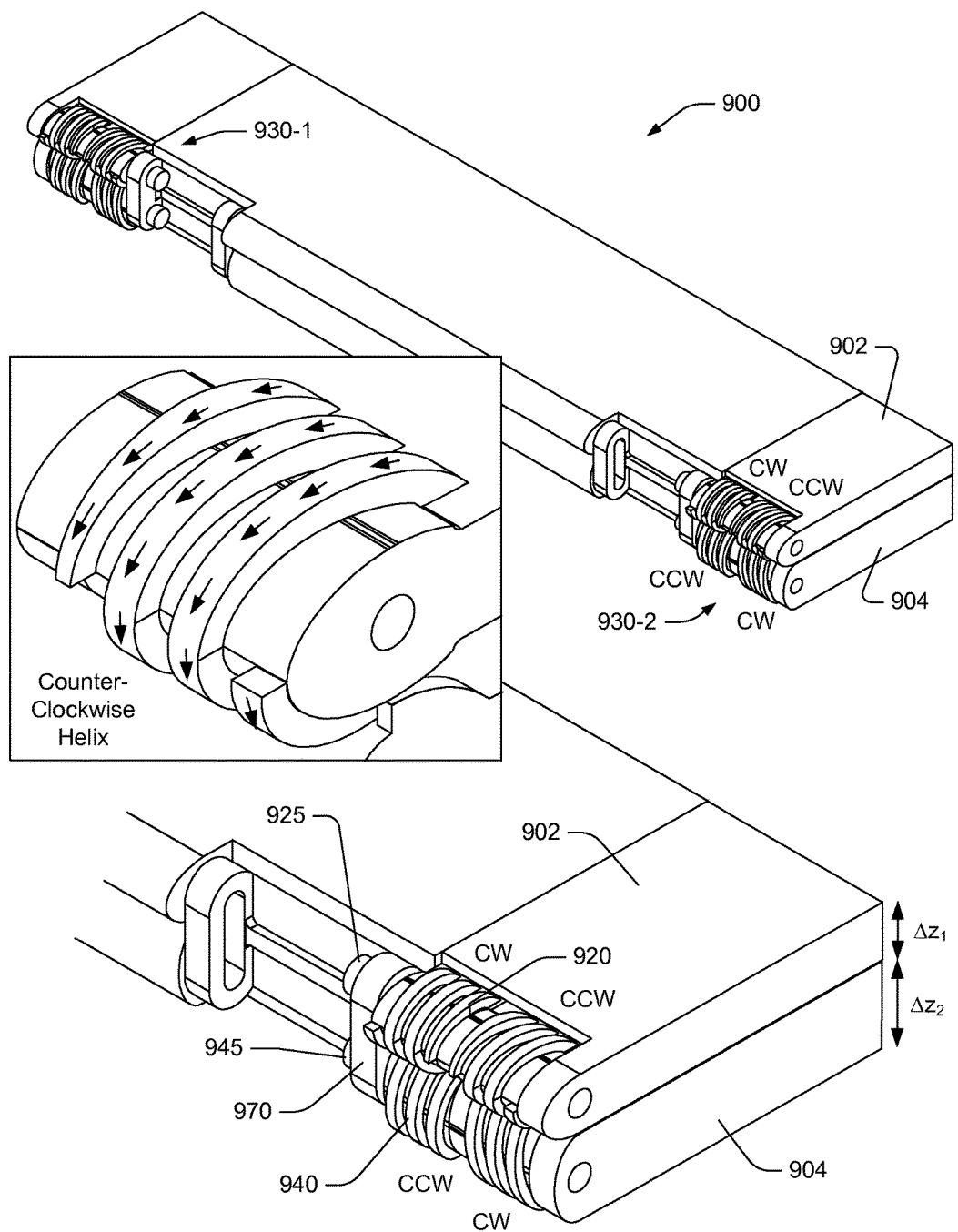
FIG. 9 is a diagram of an example of an assembly.

FIG. 9 shows an example of an assembly 900 that includes a first housing 902 that includes a front side and a back side and a thickness therebetween, a second housing 904 that includes a front side and a back side and a thickness, a first set of gears 930-1 and a second set of gears 930-2. In the example of FIG. 9, thickness dimensions $\Delta z_1$ and $\Delta z_2$ are shown for the housings 902 and 904, respectively.

As shown in FIG. 9, a first gear 920 is operatively coupled to the first housing 902 and a second gear 940 is operatively coupled to the second housing 904. In such an example, the first and second gears 920 and 940 mesh to orient the first and second housings 902 and 904, for example, in a front side-to-front side orientation and in a back side-to-back side orientation.

In the assembly 900, the gears 920 and 940 rotate about respective axles 925 and 945 that are coupled via a coupler 970. For example, the coupler 970 may be disposed at an end of the gears 920 and 940 and receive the axles 925 and 945 such that the axles 925 and 945 remain a certain distance apart and such that the housings 902 and 904 remain coupled during rotation. As an example, a coupler may be proximate to a region through which one or more cables may pass, for example, from one housing to another housing. As an example, an assembly may include more than one coupler. For example, the assembly 900 may include the coupler 970 on one side of the gears 920 and 940 and another coupler on another side of the gears 920 and 940. As an example, a coupler may be positioned between gears, for example, as a spacer between portions of a gear of a first housing and between portions of a gear of a second housing. As an example, the gears 920 and 940 may be elliptical, circular or of another shape and include teeth. For example, as shown in FIG. 9, the "teeth" are shaped as helical ridges where adjacent helical ridges are separated by a helical groove (e.g., define a helical groove). In the example of FIG. 9, the gears 920 and 940 may be referred to as worm gears.

As shown in an enlarged view, a gear may be defined with respect to a reference frame. For example, using the visible end of the housings 902 and 904 as a reference, the gear 920 includes two portions, one including a counter-clockwise helix (CCW) and the other including a clockwise helix (CW) while the gear 940 includes two portions, one including a clockwise helix (CW) and the other including a counter-clockwise helix (CCW). Thus, as illustrated in the example of FIG. 9, a CCW portion of the gear 920 meshes with a CW portion of the gear 940 and a CW portion of the gear 920 meshes with a CCW portion of the gear 940.

As an example, a gear or gears may include multiple portions with helix orientations that may differ (e.g., or be the same). As shown, a corresponding gear or gears may include multiple portions with helix orientations that can mesh with such a gear or gears. As an example, gears may include portions that act to "balance" various forces (e.g., torque, etc.). In such an example, smoother movement may be achieved for movement of a housing with respect to another housing or simultaneous movement of two housings. As an example, a gear with a clockwise portion and a counter-clockwise portion that meshes with another gear with a clockwise portion and a counter-clockwise portion may act to provide for a no-slip condition.

As an example, an assembly can include worm gears. As an example, a worm gear may be perceived, aesthetically, as being different than a spur gear. For example, helical teeth of a worm gear may be perceived as being smoother than the teeth of a spur gear. As an example, a worm gear may be fashion in a more "streamlined" manner. As an example, a worm gear may, when compared to a spur gear, have a less of an industrial look to a user.

Figure 10:
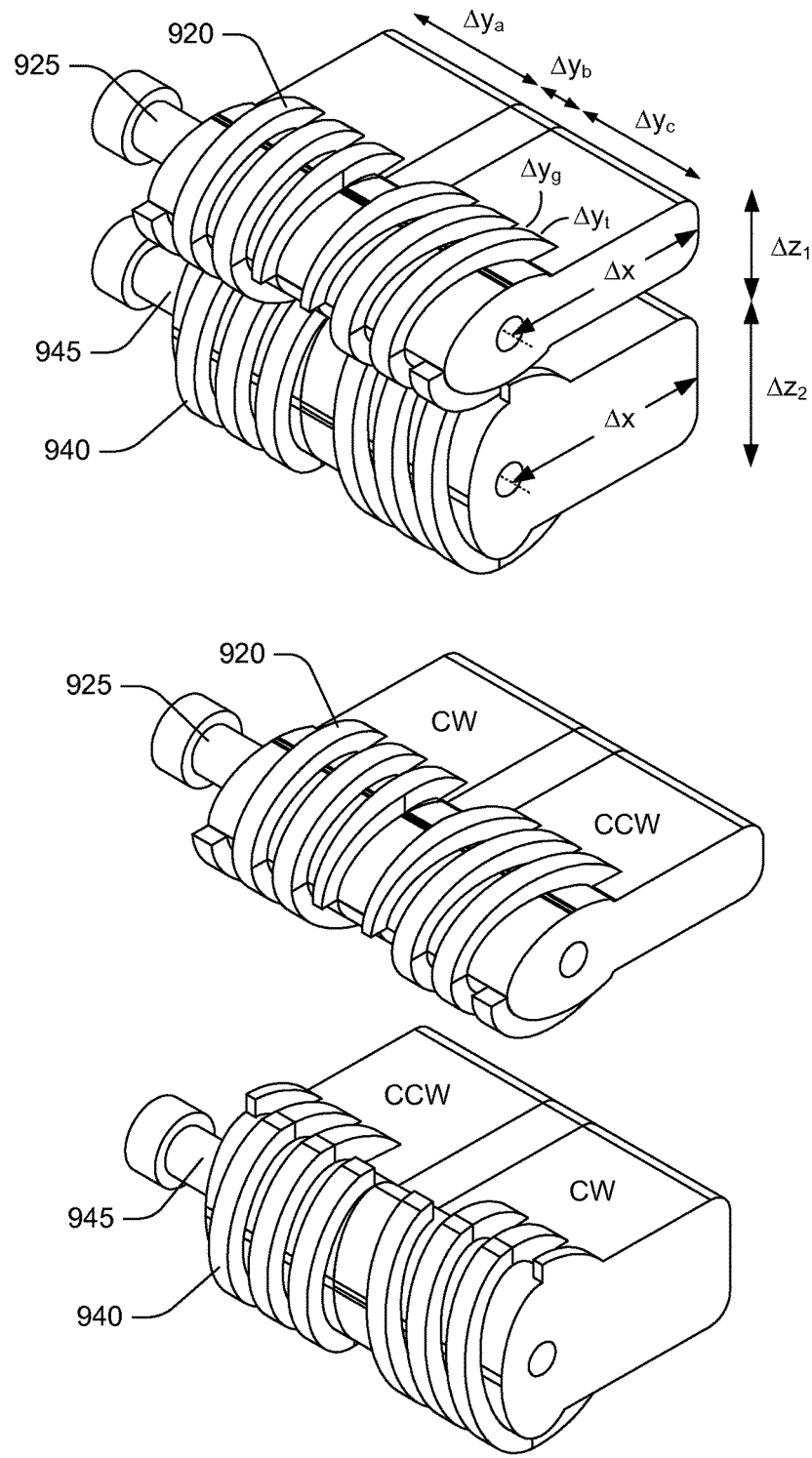
FIG. 10 is a diagram of a portion of the assembly of FIG. 9.

FIG. 10 shows the gears 920 and 940 and the axles 925 and 945. As illustrated in FIG. 10, the gears 920 and 940 can be helical elliptical gears. In such an example, helical grooves defined by helical teeth. Various examples of dimensions are shown in FIG. 10, including an axis to tongue end dimension $\Delta x$; thickness dimensions $\Delta z_1$ and $\Delta z_2$; dimensions $\Delta y_a$, $\Delta y_b$ and $\Delta y_c$, which correspond to dimensions of a gear or gear portion, a spacer and another gear or gear portion; and dimensions $\Delta y_g$ and $\Delta y_t$, which correspond to a groove dimension and a tooth or ridge dimension. As an example, teeth on a helical gear can be cut at an angle to a gear face. As an example, a helix may include multiple turns (e.g., consider two turns, three turns, etc.). As an example, a gear may be defined at least in part by a pitch (e.g., a pitch of a helix being a dimension of a helix turn as measured in a direction parallel to an axis of the helix). As an example, a gear may be described as being right-handed or left-handed or, for example, clockwise or counter-clockwise. For example, with an observer's line of sight along a helix axis, if a clockwise screwing motion moves the helix away from the observer, then it may be defined as a right-handed helix; if towards the observer, then it may be defined as left-handed helix; or, for example, a stationary helix may be viewed as spiraling away from an observer in a clockwise (CW) or counter-clockwise (CCW) manner. The extent of engagement may make helical gears operate more smoothly (e.g., and quietly) than spur gears.

As shown in FIG. 10, the teeth (e.g., ridges) span an arc angle about a substantially elliptical head portion from which a tongue portion extends. For example, the gear 920 includes a counter-clockwise portion with approximately four teeth segments (e.g., making about three turns) that define grooves therebetween (e.g., between adjacent segments) and the gear 920 includes a clockwise portion with approximately four teeth segments (e.g., making about three turns) that define grooves therebetween (e.g., between adjacent segments). The gear 940 includes a clockwise portion with approximately four teeth segments (e.g., making about three turns) that define grooves therebetween (e.g., between adjacent segments) and the gear 940 includes a counter-clockwise portion with approximately four teeth segments (e.g., making about three turns) that define grooves therebetween (e.g., between adjacent segments). As illustrated, a segment may differ from another segment. For example, an end segment may include an arc angle less than an intermediate segment.

In the example of FIG. 10, the helixes of the gear 920 terminate at or near the tongue portion, which is aligned with the major axis of the substantially elliptically shaped head portion while the helixes of the gear 940 terminate at or near the tongue portion, which is aligned with the minor axis of the substantially elliptically shaped head portion. As an example, with respect to the head portions, in the views of FIG. 10, the gear 920 may be considered an upward facing while the gear 940 may be considered forward facing. As an example, where the gear 940 is stationary, the gear 920 may rotate about the gear 920, for example, to achieve an arrangement where the gear 920 is below the gear 940 (see, e.g., uppermost view where the gear 920 is above the gear 940). In such an example, a "midway" point may be achieved where the tongue portions of the gears 920 and 940 extend away from each other, which may be referred to as a planar orientation of the gears 920 and 940.

As an example, an assembly may include a portion of the gear 920 and a portion of the gear 940. For example, consider a clockwise portion of the gear 920 and a counter-clockwise portion of the gear 940 or vice versa. As an example, a gap may exist between portions of a gear. As an example, a gear may include multiple clockwise portions and/or multiple counter-clockwise portions. For example, consider a gear such as the gear 920 with multiple clockwise portions or with multiple counter-clockwise portions or, for example, the gear 940 with multiple clockwise portions or with multiple counter-clockwise portions. As to a gap, the example of FIG. 10 shows a gap that is less than an axial length (e.g., along an axle axis) of a portion of a gear (e.g., a clockwise portion or a counter-clockwise portion). As an example, a gap may be of another dimension, which may be defined, for example, with respect to an axial length (e.g., along an axle axis) of a portion of a gear. For example, a gap may be greater than a length of a gear or a portion of a gear.

Figure 11:
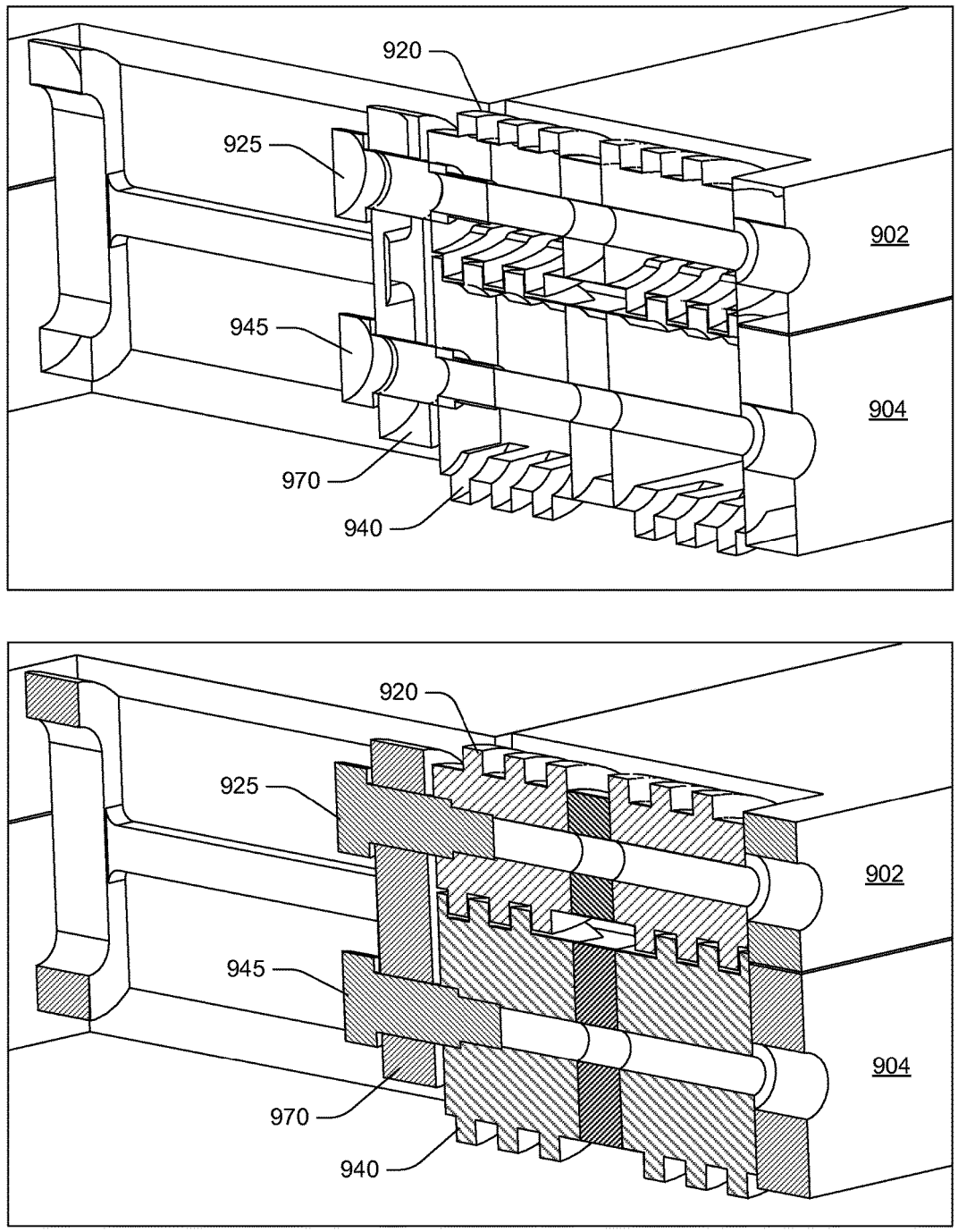
FIG. 11 is a diagram of a portion of the assembly of FIG. 9.

FIG. 11 shows a hollow cutaway view and a cutaway view of a portion of the assembly 900. As shown, the gear 920 may include one or more portions and the gear 940 may include one or more portions. For example, portions may be aligned axially along an axis defined by the axle 925 and an axis defined by the axle 945. As shown, the coupler 970 may include an opening that can receive the axle 925 and an opening that can receive the axle 945.

As mentioned, portions of a gear can include a clockwise portion and a counter-clockwise portion, a clockwise portion and a clockwise portion and/or a counter-clockwise portion and a counter-clockwise portion. As an example, each portion may be of approximately the same axial length (e.g., along an axle axis). As an example, axial lengths of portions may differ. As an example, number of teeth or segments may differ. As an example, number of grooves may differ. As an example, an assembly may include more than one type of gear (see, e.g., the blocks 310, 320, 330 and 340 of FIG. 3).

As an example, an assembly can include spacers and worm, face gear "paradoxical" gears with elliptical shapes. In such an example, the assembly may include a first housing and a second housing with different thicknesses. In such an example, worm gears may mesh (e.g., optionally via synchronized motion). As an example, worm gears may include relatively smooth profiles, which may, for example, reduce risk of finger pinch, marring/gouging a surface (e.g., a desk surface), catching clothing (e.g., grabbing a stocking from device placed on a leg or legs), etc. As an example, a left hand elliptic worm with an adjacent right hand elliptical worm in combination (e.g., optionally with a spacer between) may allow for synchronous opening/closing and enforcement of a no-slip condition. As an example, multiple gearing pairs may act to balance (e.g., share) torque load during movement of one housing with respect to another or movement of housings (e.g., synchronously).

Figure 12:
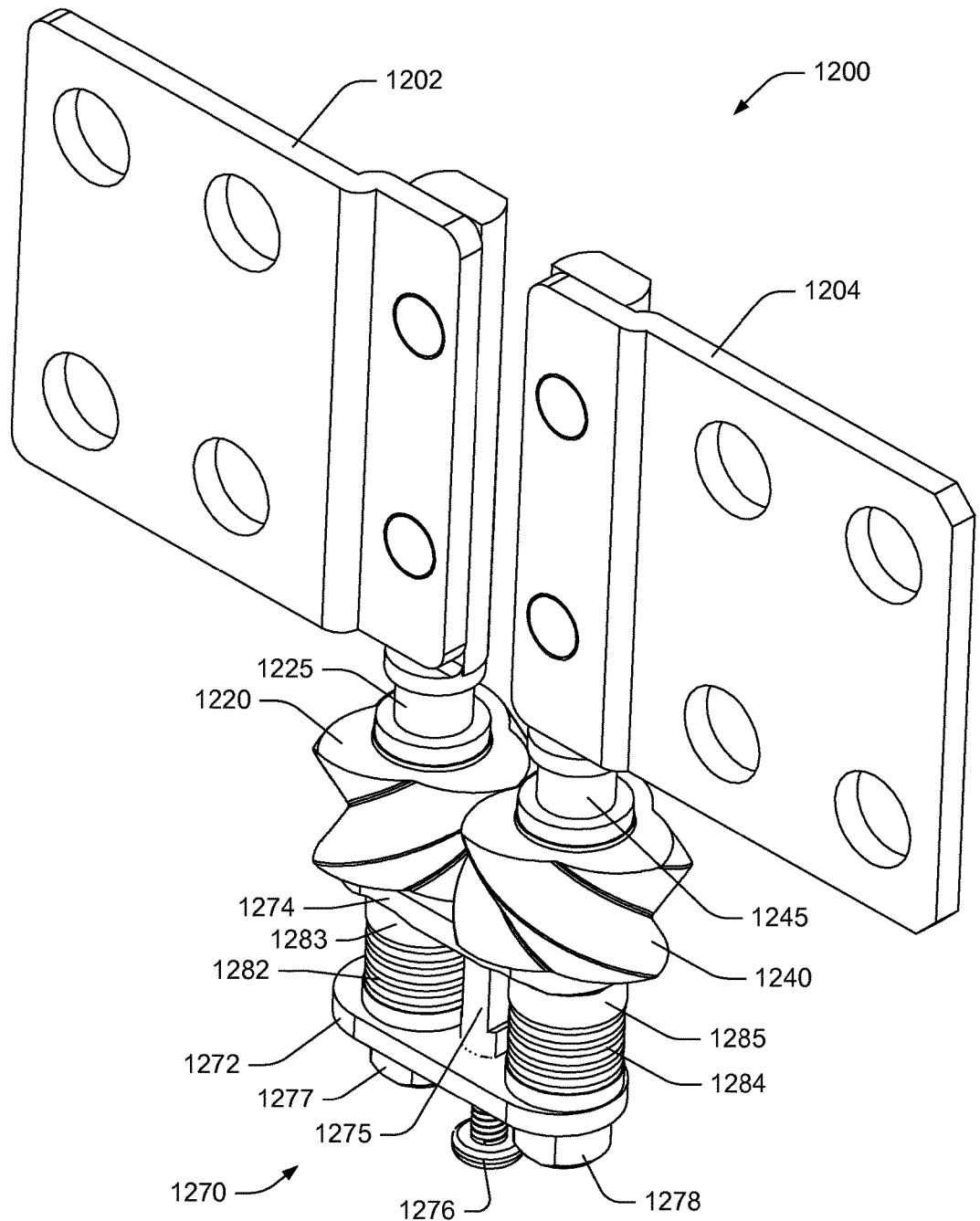
FIG. 12 is a diagram of an example of an assembly.

FIG. 12 shows an example of an assembly 1200 that includes housing connectors 1202 and 1204 that are operatively coupled to axles 1225 and 1245 of a first gear 1220 and a second gear 1240 where the gears 1220 and 1240 are lobed gears. As shown in the example of FIG. 12, the assembly can include a coupler 1270 that can include a pair of components 1272 and 1274 that are spaced by a spacer 1275 where the components 1272 and 1274 can receive the axles 1225 and 1245. Between the components 1272 and 1274, the axles 1225 and 1245 may be fit with one or more springs 1282 and 1284. For example, spring washers such as Belleville washers may be fit between the components 1272 and 1274 (e.g., coned-disc springs, conical spring washers, disc springs, cupped spring washer, etc.). A washer may include a frusto-conical shape that imparts a spring characteristic.

As an example, coupler 1270 can include one or more compression mechanisms that can apply force, for example, to one or more springs (e.g., to the spring 1282 and 1284). For example, consider the bolt or screw 1276 and the nuts 1277 and 1278.

As an example, the springs 1282 and 1284 may bias respective cam components 1283 and 1285 that may interact with features of the component 1272 or one or more of the gears 1220 and 1240.

Figure 13:
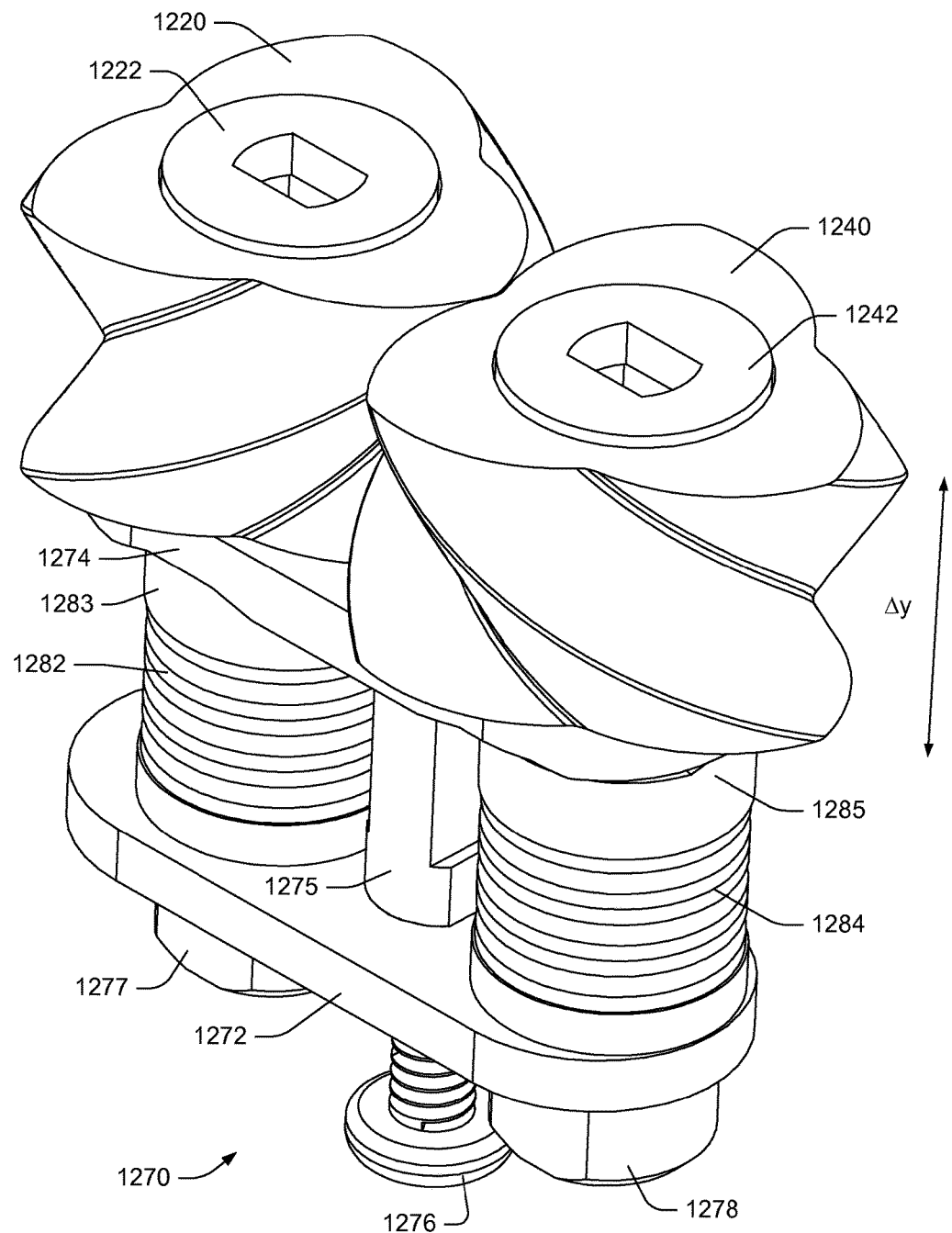
FIG. 13 is a diagram of a portion of the assembly of FIG. 12.

FIG. 13 shows a portion of the assembly 1200 without the housing connectors 1202 and 1204. As shown, the gears 1220 and 1240 may include recesses that can receive components 1222 and 1242, respectively. As shown in the example of FIG. 13, a gear may be defined by a dimension such as, for example, $\Delta y$ (e.g., a gear length).

Figure 14:
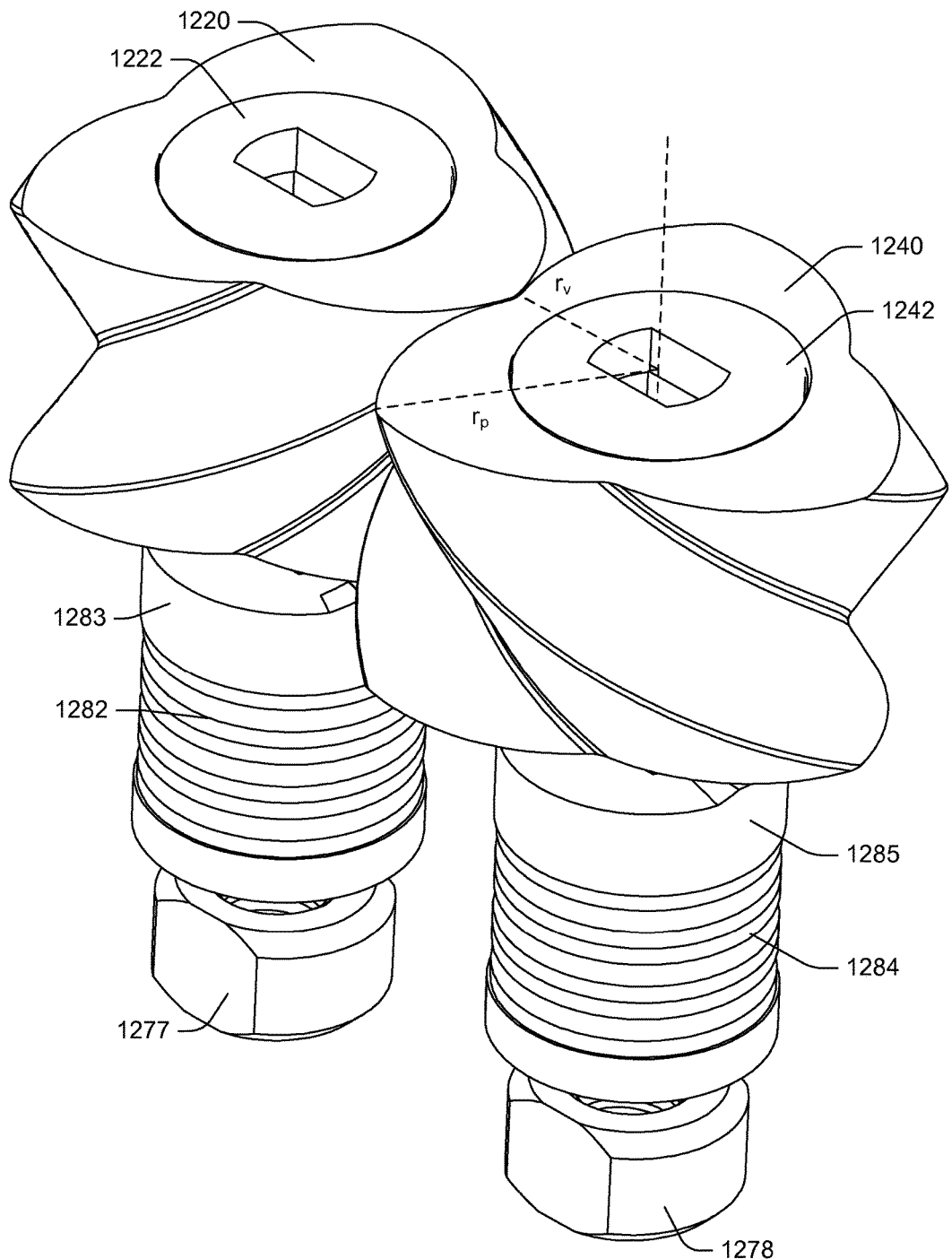
FIG. 14 is a diagram of a portion of the assembly of FIG. 12.

FIG. 14 shows a portion of the assembly 1200 without the housing connectors 1202 and 1204 and without the components 1272 and 1274, the spacer 1275 and the bolt or screw 1276. As shown in the example of FIG. 14, a gear may be defined by dimensions such as a peak radius $r_p$ and a valley radius $r_v$. In such an example, these radii may be lobe dimensions and define an angle therebetween (e.g., for a half a lobe).

Figure 15:
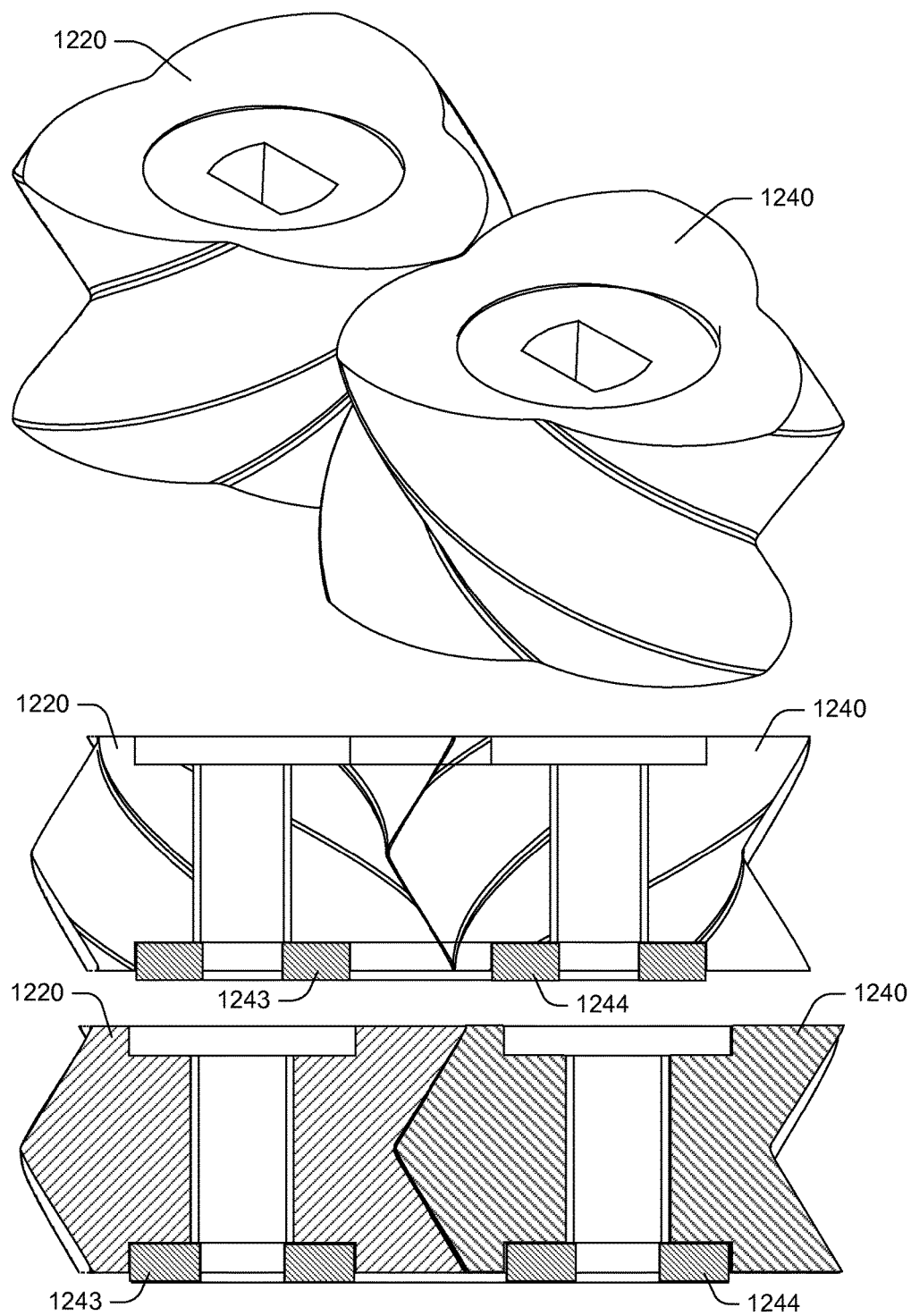
FIG. 15 is a diagram of a portion of the assembly of FIG. 12.

FIG. 15 shows the gears 1220 and 1240 in a perspective view, a hollow cutaway view and in a cross-sectional view along with components 1243 and 1244 received by recesses of the gears 1220 and 1240, respectively. As shown in FIG. 15, each of the gears 1220 and 1240 include three helical lobes. The gears 1220 and 1240 may mesh akin to helical lobed rotor, for example, of a fluid pump.

Figure 16:
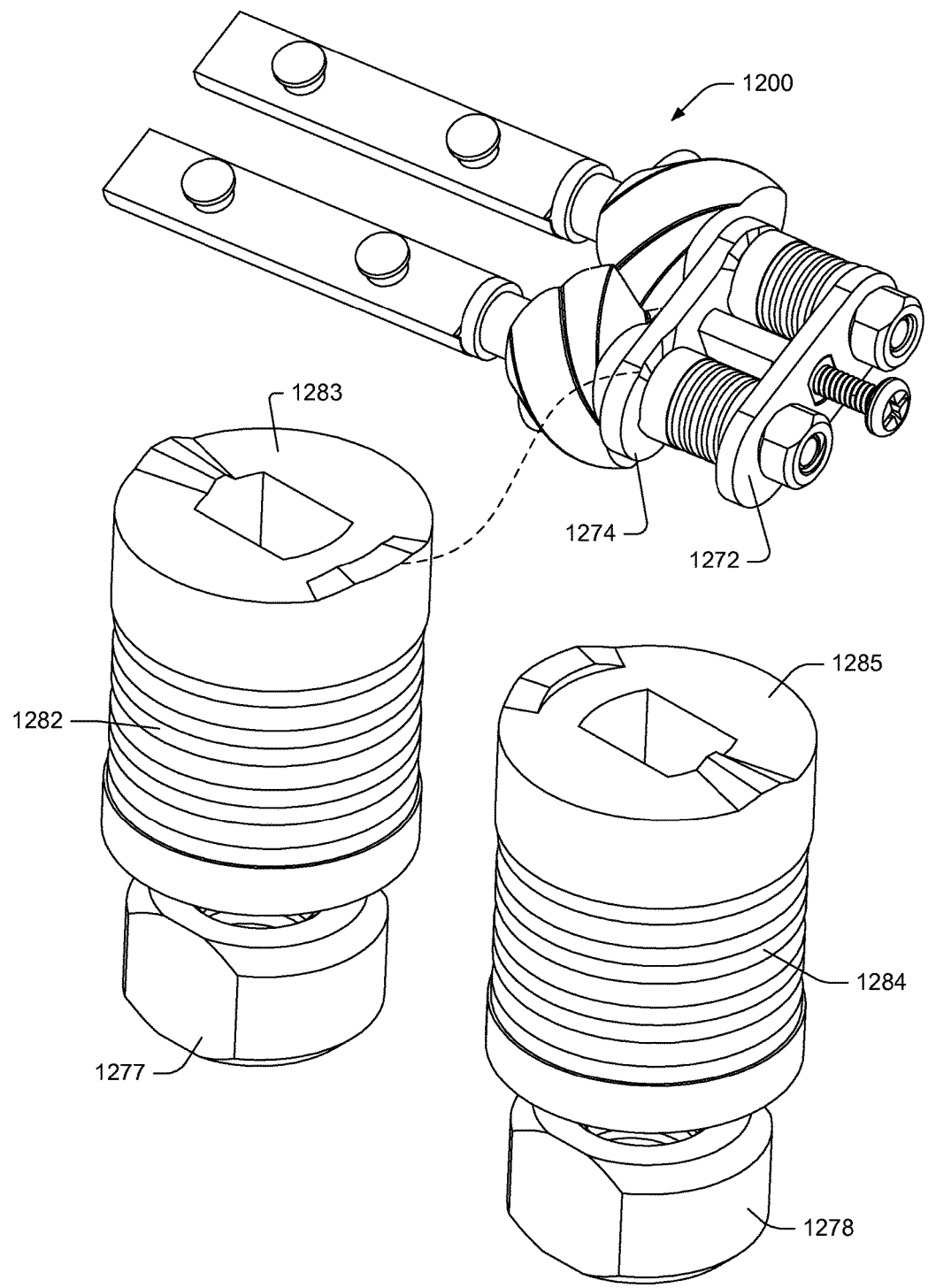
FIG. 16 is a diagram of a portion of the assembly of FIG. 12.

FIG. 16 shows the assembly 1200 and the cam components 1283 and 1285 as including features that cooperate with features of the component 1274 (see, e.g., dashed line). For example, the features may provide for locking at one or more angles of rotation of a first housing with respect to a second housing. As an example, one component may include a ridge and another component may include a valley that can receive the ridge upon rotation of one of the components with respect to the other one of the components. As an example, a component may include one or more ridges and/or one or more valleys.

In the example assembly 1200, the gears 1220 and 1240 include helical lobes that are different handed. In such an example, the gears 1220 and 1240 rotate in different directions. For example, where the gear 1220 rotates in a clockwise direction, the gear 1240 rotates in a counter-clockwise direction and vice versa. Thus, given a clamshell arrangement of two housing coupled via the assembly 1200, the gears 1220 and 1240 may rotate to orient the housings in a front side to front side orientation and in a back side to back side orientation.

As an example, a gear may include an involute profile or a non-involute profile. An involute profile can include teeth that are involutes, for example, of a circle or an ellipse. The involute of a circle may be defined by a spiraling curve traced by the end of an imaginary taut string unwinding itself from that stationary circle called the base circle.

Figure 17:
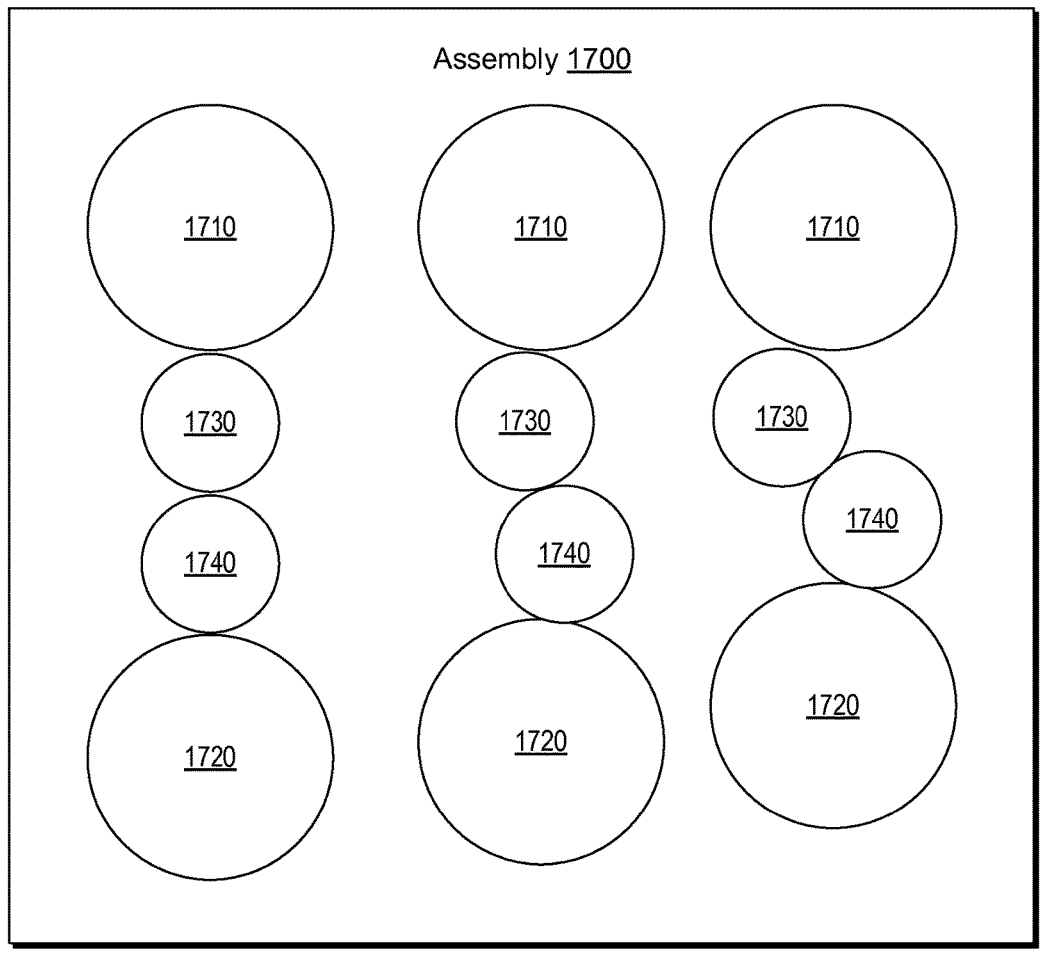
FIG. 17 is a diagram of an example of an assembly.

FIG. 17 shows an example of an assembly 1700 that includes gears 1710, 1720, 1730 and 1740. The gears 1710 and 1720 may be coupled to respective housings and the gears 1730 and 1740 may be intermediate gears that may optionally be moveable with respect to their axes. For example, an intermediate gear may shift as a housing is rotated with respect to another housing (e.g., to accommodate an orientation of the housings). As an example, an assembly may include at least one intermediate gear, for example, to minimize size of a hinge by offsetting of an intermediate gear(s) from a centered position to shorten the distance between centers of the two adjacent gears. In such an example, it may be possible to adjust for different thickness housings using a common set of gears and a selected intermediate gear or gears. As an example, consider a three gear set with an intermediate gear offset from a center defined by a first housing gear and a second housing gear.

Figure 18:
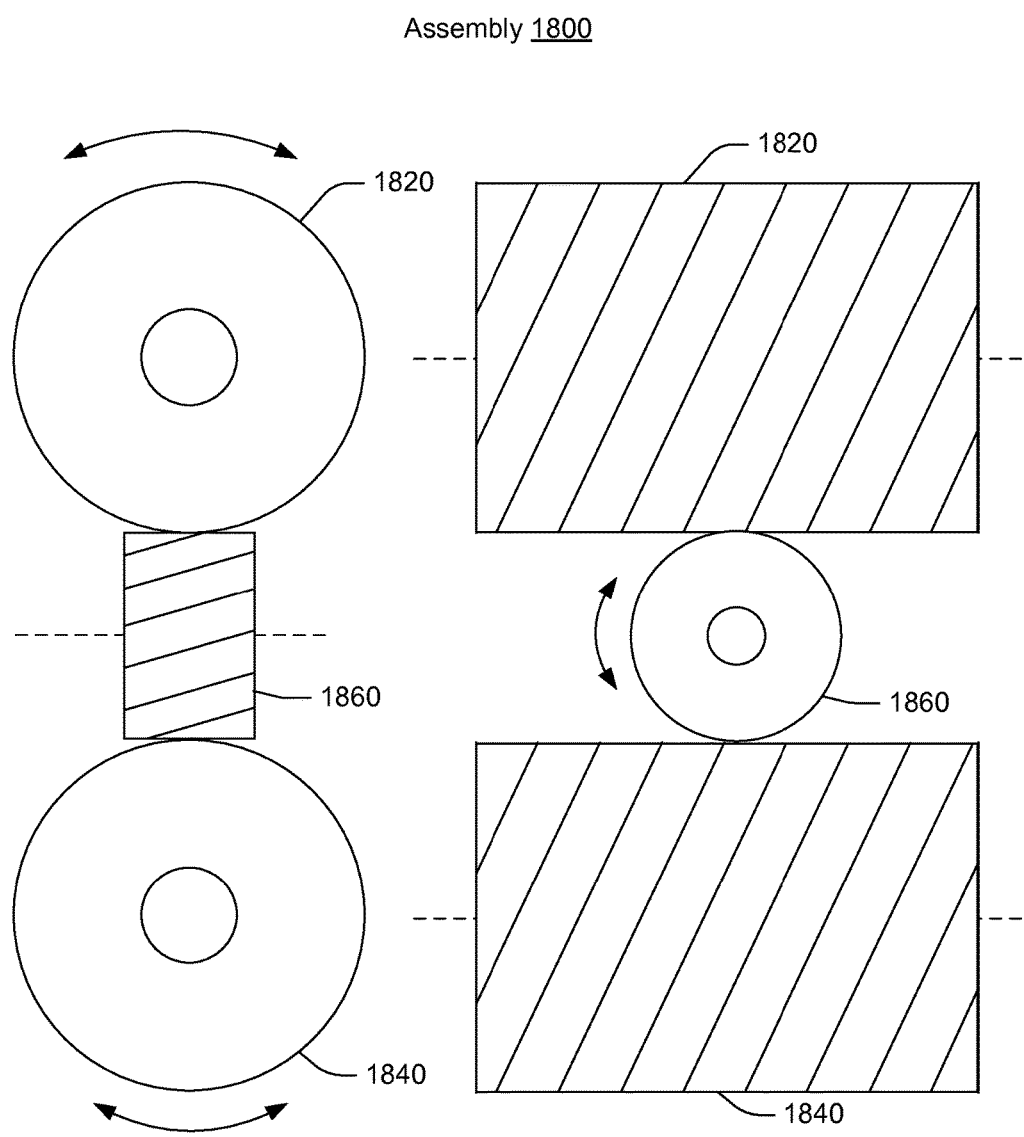
FIG. 18 is a diagram of an example of an assembly.

FIG. 18 shows an example of an assembly 1800 that include a gear 1820, a gear 1840 and a gear 1860. In the example of FIG. 18, the gears 1820 and 1840 are shown as having axes that are substantially parallel and the gear 1860 has an axis that is oriented orthogonally to the axes of the gears 1820 and 1840. In the assembly 1800, the gear 1860 may be a space gear that acts to couple the gears 1820 and 1840, for example, to accommodate a difference in space for two housings.

As an example, an assembly can include an intermediate gear or intermediate gears. For example, the gear 1860 may be considered to be an intermediate gear. As an example, a hinge assembly may include one or more intermediate gears that may be sized with respect to a pair of gears, for example, to minimize size of the hinge assembly, for example, by offsetting of one or more intermediate gear(s) from a centered position, it is possible to achieve a result that shortens a distance between centers of the two main gears. In such an example, an intermediate gear or intermediate gears allows for assemblies of different thicknesses of housings to possibly implement a standard pair of main gears (e.g., where adjustments occur via sizing, positioning, etc. of one or more intermediate gears). As an example, a three gear set may include an intermediate gear offset from centers of the other two gears.

As an example, an apparatus can include a processor; memory accessible by the processor; a first housing that includes a front side and a back side and a thickness therebetween; a second housing that includes a front side and a back side and a thickness therebetween; a first gear operatively coupled to the first housing; and a second gear operatively coupled to the second housing where the first and second gears mesh to orient the first and second housings in a front side to front side orientation and in a back side to back side orientation. In such an example, the first gear can include a rotational axis, a major axis and a minor axis and the second gear can include a rotational axis, a major axis and a minor axis (e.g., where a minor axis has a dimension less than a dimension of a major axis). As an example, rotational axes may offset.

As an example, a minor axis of a first gear may be substantially aligned with a thickness of a first housing and a major axis of a second gear may be substantially aligned with a thickness of the second housing. As an example, an assembly may include two or more housings, for example, where gears mesh for positioning the housings with respect to each other. In such an example, thicknesses may differ, two or more thicknesses may be substantially the same, etc. As an example, a first housing may include gears that mesh with gears of a second housing and a third housing may include gears that mesh with the gears or other gears of the second housing. As an example, a housing may include a gear to mesh with one housing and a gear to mesh with another housing.

As an example, an apparatus may include a housing that includes a display and/or a housing that includes a keyboard. For example, an apparatus may include a first housing that includes a display and a second housing that includes a keyboard.

As an example, an apparatus may include a first gear of a first housing and a second gear of a second housing that include respective teeth where the teeth can mesh for orienting the first and second housings with respect to each other.

As an example, a gear or gears may be helical gears. As an example, a first gear can include a clockwise helix and a second gear can include a counter-clockwise helix. For example, the first gear may mesh with the second gear via a ridge (e.g., a helical tooth or helically arranged teeth) that is received in a groove (e.g., a helical groove or grooves). As an example, an apparatus may include multiple sets of gears. In such an example, a first housing may include a helical gear with a clockwise orientation and a helical gear with a counter-clockwise orientation and a second housing may include a helical gear with a counter-clockwise orientation and a helical gear with a clockwise orientation (see, e.g., FIG. 9). In such an example, rotation of the housings via meshing of the gears may be "balanced" as to forces that may be particular to helical gears. As an example, a helical gear may be a worm gear.

As an example, an apparatus can include lobe gears. For example, an apparatus with housings can include a lobe gear operatively coupled to one housing that meshes with a lobe gear operatively coupled to another housing. In such an example, each of the lobe gears may include multiple lobes (e.g., 2 lobes, 3 lobes, etc.).

As an example, a plurality of lobes of a first gear may be helical about a rotational axis of the first gear, a plurality of lobes of a second gear may be helical about a rotational axis of the second gear and, for example, the rotational axis of the first gear and the rotational axis of the second gear may be offset.

As an example, an apparatus may include at least one cam mechanism that can operate via meshed rotation of a first gear and a second gear. In such an example, the cam mechanism may include "stops". For example, consider a stop associated with a particular orientation of a housing with respect to another housing. In such an example, a stop may be for a planar orientation, for a front side to front side orientation, for a back side to back side orientation, for an angled orientation (e.g., in a range from about 90 degrees to about 135 degrees, which may be a "laptop" orientation of a display housing with respect to a keyboard housing), etc.

As an example, a thickness of a first housing may be less than a thickness of a second housing. As an example, a thickness of a first housing may be approximately the same as a thickness of a second housing.

As an example, first and second gears may mesh to orient a first housing and a second housing in a planar orientation. For example, consider a planar orientation where the first housing is substantially centered with respect to the thickness of the second housing.

As an example, an apparatus can include a first gear and a second gear that are substantially circular (e.g., circular gears of a common diameter). In such an example, a thickness of a first housing may be approximately equal to a thickness of a second housing. In such an example, the first and second gears can mesh to orient the first and second housings in a planar orientation, which may be a flush orientation (e.g., where respective front and back surfaces of the first housing and the second housing are flush). As an example, a first housing may be a display housing and a second housing may be a display housing where a flush orientation (e.g., flush planar orientation) of the housings creates a substantially flush unified display. In such an example, the unified display or at least a portion thereof may be a touch-sensitive display. As an example, such a display may include associated digitizer circuitry, for example, for use with a passive and/or an active object (e.g., a token, tokens, a stylus, etc.).

As an example, an apparatus may include gears that include shapes of one or more conical sections. For example, such conical sections may be circles or ellipses (e.g., consider cutting a cone with a plane disposed at an angle to an axis of the cone).

As an example, an apparatus may include gears that include radial faces. In such an example, the radial faces may be of elliptical shapes. As an example, radial faces may include teeth.

As an example, an apparatus can include a guard. For example, consider a plate or a series of parallel plates. As an example, a plate or plates may be positioned proximate to a first gear and a plate or plates may be positioned proximate to a second gear where the first and second gears mesh to orient respective housings.

As an example, a first gear may be disposed between sets of parallel plates and a second gear may be disposed between sets of parallel plates. In such an example, the sets of parallel plates associated with the first gear may form an interference fit with the sets of parallel plates associated with the second gear. As an example, an apparatus may include an adjustment mechanism that adjusts such an interference fit (e.g., to loosen or to tighten the fit via a spring, via a screw, via a bolt, etc.). As an example, an apparatus may include an adjustment mechanism that adjusts a contact force between a first gear and a second gear where the gears mesh.

As an example, an apparatus can include a cabling mechanism that carries a cable. For example, consider a mechanism that locates a cable such that the cable experiences less stress, less risk of catching, etc. as two or more housings are oriented with respect to each other via meshing gears. As an example, a cable may electrically couple circuitry of a housing to circuitry of one or more other housings.

As an example, a first gear can include an axle and a second gear can include an axle. In such an example, a spring may be disposed about the axel of the first gear and/or the axle of the second gear where, for example, the spring may bias a cam mechanism. As an example, a gear can include a portion of such a cam mechanism.

As an example, an apparatus may include a biasing element that applies a biasing force that locks a first housing in an orientation with respect to a second housing. As an example, such a biasing element may apply the biasing force to a cam mechanism.

As an example, an apparatus may include a plurality of gears where one or more of the gears may be intermediate gears that mesh with two or more other gears. As an example, consider an apparatus with a third gear operatively coupled to a first housing and a fourth gear operatively coupled to a second housing. In such an example, the third and fourth gears may mesh to orient first and second housings in a front side-to-front side orientation and in a back side-to-back side orientation.

As an example, first and second gears may form a first gear set and third and fourth gears may form a second gear set. In such an example, an apparatus may include a first guard associated with the first gear set and a second guard associated with the second gear set. As an example, at least one of the first guard and the second guard may mechanically controls an orientation force for changing an orientation of the first housing with respect to the second housing (e.g., via interference fit(s), etc.).

As an example, an apparatus can include a processor; memory accessible by the processor; a first housing that includes a front side and a back side and a thickness therebetween; a second housing that includes a front side and a back side and a thickness therebetween; a first gear operatively coupled to the first housing; a second gear operatively coupled to the second housing; and an intermediate gear where the first and second gears mesh with the intermediate gear to orient the first and second housings in a front side to front side orientation and in a back side to back side orientation. In such an example, the first gear can include an axis and the second gear can include an axis where the axes are substantially parallel. In such an example, the intermediate gear may include an axis oriented in a direction that is perpendicular to a plane defined by the axes of the first and second gears.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 19:
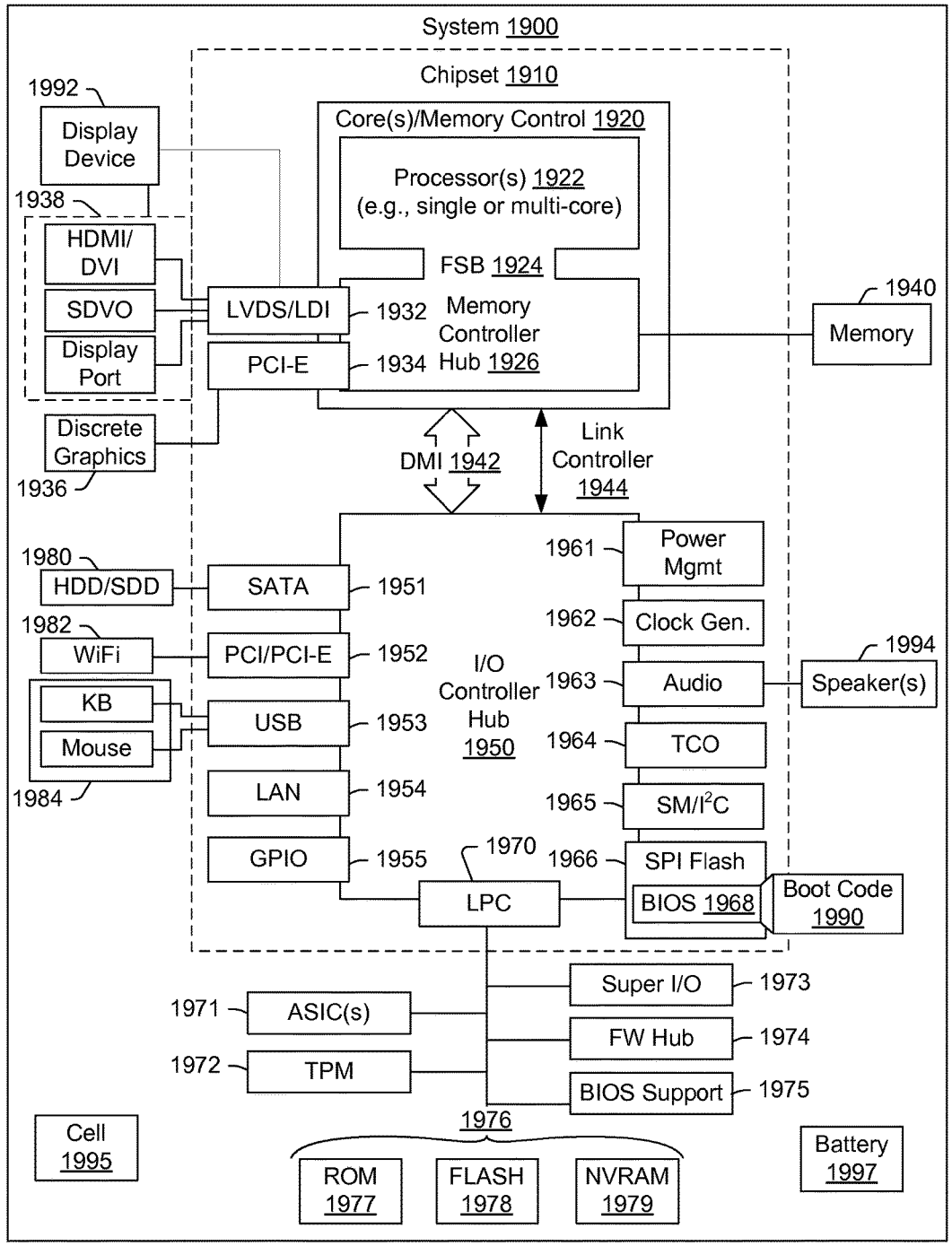
FIG. 19 is a diagram of an example of a system that includes one or more processors.

While various examples of circuits or circuitry have been discussed, FIG. 19 depicts a block diagram of an illustrative computer system 1900. The system 1900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1900. As an example, a system such as the system 100 of FIG. 1 may include at least some of the features of the system 1900.

As shown in FIG. 19, the system 1900 includes a so-called chipset 1910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 19, the chipset 1910 has a particular architecture, which may vary to some extent depending on brand or manufacturer. The architecture of the chipset 1910 includes a core and memory control group 1920 and an I/O controller hub 1950 that exchange information (e.g., data, signals, commands, etc.) via, for example, a direct management interface or direct media interface (DMI) 1942 or a link controller 1944. In the example of FIG. 19, the DMI 1942 is a chip-to-chip interface (sometimes referred to as being a link between a "northbridge" and a "southbridge").

The core and memory control group 1920 include one or more processors 1922 (e.g., single core or multi-core) and a memory controller hub 1926 that exchange information via a front side bus (FSB) 1924. As described herein, various components of the core and memory control group 1920 may be integrated onto a single processor die, for example, to make a chip that supplants the conventional "northbridge" style architecture.

The memory controller hub 1926 interfaces with memory 1940. For example, the memory controller hub 1926 may provide support for DDR SDRAM memory (e.g., DDR, DDR2, DDR3, etc.). In general, the memory 1940 is a type of random-access memory (RAM). It is often referred to as "system memory".

The memory controller hub 1926 further includes a low-voltage differential signaling interface (LVDS) 1932. The LVDS 1932 may be a so-called LVDS Display Interface (LDI) for support of a display device 1992 (e.g., a CRT, a flat panel, a projector, etc.). A block 1938 includes some examples of technologies that may be supported via the LVDS interface 1932 (e.g., serial digital video, HDMI/DVI, display port). The memory controller hub 1926 also includes one or more PCI-express interfaces (PCI-E) 1934, for example, for support of discrete graphics 1936. Discrete graphics using a PCI-E interface has become an alternative approach to an accelerated graphics port (AGP). For example, the memory controller hub 1926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1950 includes a variety of interfaces. The example of FIG. 19 includes a SATA interface 1951, one or more PCI-E interfaces 1952 (optionally one or more legacy PCI interfaces), one or more USB interfaces 1953, a LAN interface 1954 (more generally a network interface), a general purpose I/O interface (GPIO) 1955, a low-pin count (LPC) interface 1970, a power management interface 1961, a clock generator interface 1962, an audio interface 1963 (e.g., for speakers 1994), a total cost of operation (TCO) interface 1964, a system management bus interface (e.g., a multi-master serial computer bus interface) 1965, and a serial peripheral flash memory/controller interface (SPI Flash) 1966, which, in the example of FIG. 19, includes BIOS 1968 and boot code 1990. With respect to network connections, the I/O hub controller 1950 may include integrated gigabit Ethernet controller lines multiplexed with a PCI-E interface port. Other network features may operate independent of a PCI-E interface.

The interfaces of the I/O hub controller 1950 provide for communication with various devices, networks, etc. For example, the SATA interface 1951 provides for reading, writing or reading and writing information on one or more drives 1980 such as HDDs, SDDs or a combination thereof. The I/O hub controller 1950 may also include an advanced host controller interface (AHCI) to support one or more drives 1980. The PCI-E interface 1952 allows for wireless connections 1982 to devices, networks, etc. The USB interface 1953 provides for input devices 1984 such as keyboards (KB), one or more optical sensors, mice and various other devices (e.g., microphones, cameras, phones, storage, media players, etc.). On or more other types of sensors may optionally rely on the USB interface 1953 or another interface (e.g., I²C, etc.). As to microphones, the system 1900 of FIG. 19 may include hardware (e.g., audio card) appropriately configured for receipt of sound (e.g., user voice, ambient sound, etc.).

In the example of FIG. 19, the LPC interface 1970 provides for use of one or more ASICs 1971, a trusted platform module (TPM) 1972, a super I/O 1973, a firmware hub 1974, BIOS support 1975 as well as various types of memory 1976 such as ROM 1977, Flash 1978, and non-volatile RAM (NVRAM) 1979. With respect to the TPM 1972, this module may be in the form of a chip that can be used to authenticate software and hardware devices. For example, a TPM may be capable of performing platform authentication and may be used to verify that a system seeking access is the expected system.

The system 1900, upon power on, may be configured to execute boot code 1990 for the BIOS 1968, as stored within the SPI Flash 1966, and thereafter processes data under the control of one or more operating systems and application software (e.g., stored in system memory 1940). An operating system may be stored in any of a variety of locations and accessed, for example, according to instructions of the BIOS 1968. Again, as described herein, a satellite, a base, a server or other machine may include fewer or more features than shown in the system 1900 of FIG. 19. Further, the system 1900 of FIG. 19 is shown as optionally include cell phone circuitry 1995, which may include GSM, CDMA, etc., types of circuitry configured for coordinated operation with one or more of the other features of the system 1900. Also shown in FIG. 19 is battery circuitry 1997, which may provide one or more battery, power, etc., associated features (e.g., optionally to instruct one or more other components of the system 1900). As an example, a SMBus may be operable via a LPC (see, e.g., the LPC interface 1970), via an I²C interface (see, e.g., the SM/I²C interface 1965), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   memory accessible by the processor;
   a first housing that comprises a front side and a back side and a thickness therebetween;
   a second housing that comprises a front side and a back side and a thickness therebetween;
   a first gear operatively coupled to the first housing; and
   a second gear operatively coupled to the second housing
      wherein the first and second gears mesh to orient the first and second housings in a front side to front side orientation and in a back side to back side orientation wherein the first gear comprises a rotational axis, a major axis and a minor axis and wherein the second gear comprises a rotational axis, a major axis and a minor axis.

2. The apparatus of claim 1 wherein the rotational axes are offset.

3. The apparatus of claim 1 wherein the minor axis of the first gear is substantially aligned with the thickness of the first housing and wherein the major axis of the second gear is substantially aligned with the thickness of the second housing.

4. The apparatus of claim 1 wherein the first housing comprises a display.

5. The apparatus of claim 4 wherein the second housing comprises a keyboard.

6. The apparatus of claim 1 wherein the first gear and the second gear comprise teeth.

7. The apparatus of claim 1 wherein the first gear and the second gear comprise helical gears.

8. The apparatus of claim 7 wherein the first gear comprises a clockwise helix and wherein the second gear comprises a counter-clockwise helix.

9. The apparatus of claim 1 further comprising at least one cam mechanism that operates via meshed rotation of the first gear and the second gear.

10. The apparatus of claim 1 wherein the thickness of the first housing is less than the thickness of the second housing.

11. The apparatus of claim 10 wherein the first and second gears mesh to orient the first and second housings in a planar orientation wherein the planar orientation comprises the first housing centered with respect to the thickness of the second housing.

12. The apparatus of claim 1 wherein the first and second gears comprises conical sections.

13. The apparatus of claim 12 wherein the conical sections comprise ellipses.

14. The apparatus of claim 1 wherein the first and second gears comprise radial faces wherein the radial faces comprise elliptical shapes.

15. The apparatus of claim 1 comprising a guard wherein the guard comprises parallel plates.

16. The apparatus of claim 1 comprising a cabling mechanism that carries a cable wherein the cable electrically couples circuitry of the first housing to circuitry of the second housing.

17. The apparatus of claim 1 wherein the first gear comprises an axle and wherein the second gear comprises an axle.

18. The apparatus of claim 1 wherein the major axis and the minor axis of the first gear correspond to a first ellipse and wherein the major axis and the minor axis of the second gear correspond to a second ellipse.

19. The apparatus of claim 1 wherein the first housing comprises the processor and the memory and wherein the second housing comprises circuitry operatively coupled to the processor.

20. An apparatus comprising:

a processor;

memory accessible by the processor;

a first housing that comprises a front side and a back side and a thickness therebetween;

a second housing that comprises a front side and a back side and a thickness therebetween;

a first lobed gear operatively coupled to the first housing; and a second lobed gear operatively coupled to the second housing wherein the first and second lobed gears mesh to orient the first and second housings in a front side to front side orientation and in a back side to back side orientation wherein the first lobed gear comprises a plurality of lobes, wherein the second lobed gear comprises a plurality of lobes, wherein the first lobed gear comprises a rotational axis, a peak radius and a valley radius and wherein the second lobed gear comprises a rotational axis, a peak radius and a valley radius.

* * * * *